United States Patent [19]

Omura et al.

[11] Patent Number: 5,253,268
[45] Date of Patent: Oct. 12, 1993

[54] METHOD AND APPARATUS FOR THE CORRELATION OF SAMPLE BITS OF SPREAD SPECTRUM RADIO SIGNALS

[75] Inventors: Jimmy K. Omura, Cupertino; Dan Avidor, Sunnyvale; Mark Heising, Palo Alto, all of Calif.

[73] Assignee: Cylink Corporation, Sunnyvale, Calif.

[21] Appl. No.: 721,842

[22] Filed: Jun. 24, 1991

Related U.S. Application Data

[62] Division of Ser. No. 528,020, May 20, 1990, Pat. No. 5,166,952.

[51] Int. Cl.$^5$ .............................................. H04K 1/00
[52] U.S. Cl. ........................................ 375/1; 380/34
[58] Field of Search .................. 380/33, 34, 38, 39, 380/40, 49, 50; 375/1, 38; 370/18; 455/59, 103; 364/819, 824, 728.04, 728.06

[56] References Cited

U.S. PATENT DOCUMENTS

| | | | |
|---|---|---|---|
| 3,831,013 | 8/1974 | Alsup et al. | 364/728.06 |
| 3,900,721 | 8/1975 | Speiser et al. | 364/728.06 X |
| 4,112,372 | 9/1978 | Holmes et al. | |
| 4,222,115 | 9/1980 | Cooper et al. | |
| 4,238,850 | 12/1980 | Vance | |
| 4,247,942 | 1/1981 | Hauer | |
| 4,392,232 | 7/1983 | Andren et al. | 364/728.06 X |
| 4,418,393 | 11/1983 | Zscheile, Jr. | |
| 4,418,425 | 11/1983 | Fennel, Jr. et al. | |

(List continued on next page.)

OTHER PUBLICATIONS

M. K. Simon, J. K. Omura, R. A. Scholtz and B. K. Levitt, *Spread Spectrum Communications*, vol. 1, pp. 1-39, Rockville, Md.: Computer Science Press, 1985.

M. K. Simon, J. K. Omura, R. A. Scholtz and B. K. Levitt, *Spread Spectrum Communications*, vol. 3, pp. 346-407, Rockville, Md.: Computer Science Press, 1985.

R. A. Scholtz, "The Origins of Spread-Spectrum Communications", *IEEE Trans. Commun.*, COM-30, No. 5, pp. 822-854, May 1982.

R. L. Pickholtz, D. L. Schilling and L. B. Milstein, "Theory of Spread-Spectrum Communications-A Tutorial", *IEEE Trans. Commun.*, COM-30, No. 5, pp. 855-884, May 1982.

R. A. Scholtz, "Notes on Spread-Spectrum History", *IEEE Trans. Commun.*, COM-31, No. 1, pp. 82-84, Jan. 1983.

R. Price, "Further Notes and Anecdotes on Spread-Spectrum Origins", *IEEE Trans. Commun.*, COM-31, No. 1, pp. 85-97, Jan. 1983.

M. Kavehrad, "Performance of Nondiversity Receivers for Spread Spectrum in Indoor Wireless Communications", *AT&T Technical J.*, vol. 64, No. 6, pp. 1181-1210, Jul.-Aug. 1985.

M. Kavehrad and P. J. McLane, "Spread Spectrum for Indoor Digital Radio", *IEEE Commun. Mag.*, vol. 25, No. 6, pp. 32-40, Jun. 1987.

M. Kavehrad and G. E. Bodeep, "Design and Experimental Results for a Direct-Sequence Spread-Spectrum Radio Using Differential Phase-Shift Keying Modulation for Indoor Wireless Communications", *IEEE Trans. Commun.*, SAC-5, No. 5, pp. 815-823, Jun. 1987.

*Primary Examiner*—Tod R. Swann
*Attorney, Agent, or Firm*—David Newman & Associates

[57] ABSTRACT

A spread spectrum receiver correlator for a with filters matched to transmitter chip codes are implemented in digital circuits along with a digital circuit for acquisition and tracking of the arrival times of the chip codes. The digital circuit implementations are used for the noncoherent demodulation of pulse position spread spectrum modulation signals where the pulse is a carrier modulator by a chip code and for the noncoherent demodulation of multiple chip code modulation signals where each information symbol is represented by one of several chip codes modulating a carrier.

6 Claims, 15 Drawing Sheets

U.S. PATENT DOCUMENTS

| | | |
|---|---|---|
| 4,425,642 | 1/1984 | Moses et al. . |
| 4,455,651 | 6/1984 | Baran . |
| 4,471,164 | 9/1984 | Henry . |
| 4,479,226 | 10/1984 | Prabbu et al. . |
| 4,512,013 | 4/1985 | Nash et al. . |
| 4,523,311 | 6/1985 | Lee et al. . |
| 4,553,130 | 11/1985 | Kato . |
| 4,563,774 | 1/1986 | Gloge . |
| 4,606,039 | 8/1986 | Nicolas et al. . |
| 4,612,637 | 9/1986 | Davis et al. . |
| 4,621,365 | 11/1986 | Chiu . |
| 4,647,863 | 3/1987 | Skudera, Jr. et al. . |
| 4,649,549 | 3/1987 | Halpern et al. . |
| 4,653,069 | 3/1987 | Roeder . |
| 4,660,164 | 4/1987 | Leibowitz . |
| 4,672,605 | 6/1987 | Hustig et al. . |
| 4,672,629 | 6/1987 | Beier . |
| 4,672,658 | 6/1987 | Kavehrad et al. . |
| 4,675,839 | 6/1987 | Kerr . |
| 4,680,785 | 7/1987 | Akiyama et al. . |
| 4,691,326 | 9/1987 | Tsuchiya . |
| 4,697,260 | 9/1987 | Grauel et al. . |
| 4,703,474 | 10/1987 | Foschini et al. . |
| 4,707,839 | 11/1987 | Andren et al. . |
| 4,718,080 | 1/1988 | Serrano et al. . |
| 4,730,340 | 3/1988 | Frazier, Jr. . |
| 4,742,512 | 5/1988 | Akashi et al. . |
| 4,757,495 | 7/1988 | Decker et al. . |
| 4,759,034 | 7/1988 | Nagazumi . |
| 4,789,983 | 12/1988 | Acampora et al. . |
| 4,799,253 | 1/1989 | Stern et al. . |
| 4,805,208 | 2/1989 | Schwartz . |
| 4,807,222 | 2/1989 | Amitay . |
| 4,837,802 | 6/1989 | Higashiyama et al. . |
| 4,843,350 | 6/1989 | Nazarathy et al. . |
| 4,843,586 | 6/1989 | Nazarathy et al. . |
| 4,850,036 | 7/1989 | Smith . |
| 4,860,307 | 8/1989 | Nakayama . |
| 4,866,732 | 9/1989 | Carey et al. . |
| 4,894,842 | 1/1990 | Broekhoven et al. . |
| 4,901,307 | 2/1990 | Gilhousen et al. . |
| 4,914,651 | 4/1990 | Lusignan . |
| 4,922,506 | 5/1990 | McCallister et al. . |
| 4,930,140 | 5/1990 | Cripps et al. . |
| 4,932,037 | 6/1990 | Simpson et al. . |
| 4,969,159 | 11/1990 | Belcher et al. . |
| 4,977,577 | 12/1990 | Arthur et al. . |
| 4,977,578 | 12/1990 | Ishigaki et al. . |
| 5,005,169 | 4/1991 | Bronder et al. . |
| 5,016,255 | 5/1991 | Dixon et al. ............................ 375/1 |
| 5,016,256 | 5/1991 | Stewart . |
| 5,022,047 | 6/1991 | Dixon et al. ............................ 375/1 |
| 5,023,887 | 6/1991 | Takeuchi et al. ....................... 375/1 |
| 5,029,181 | 7/1991 | Endo et al. ............................. 375/1 |
| 5,040,238 | 8/1991 | Comboe et al. . |
| 5,048,052 | 9/1991 | Hamatsu et al. . |
| 5,056,109 | 10/1991 | Gilhousen et al. . |
| 5,081,642 | 1/1992 | O'Clock, Jr. et al. ................... 375/1 |

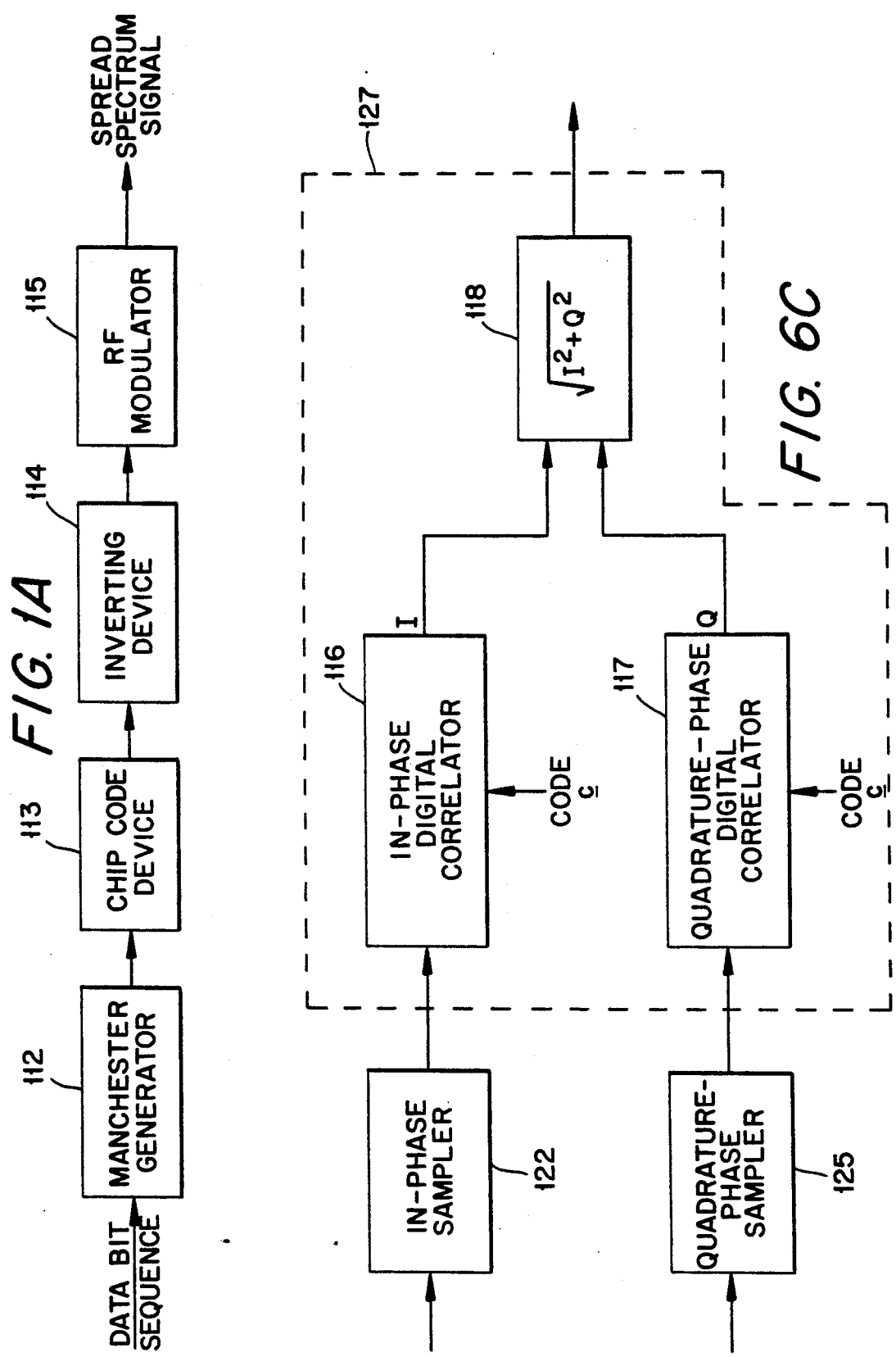

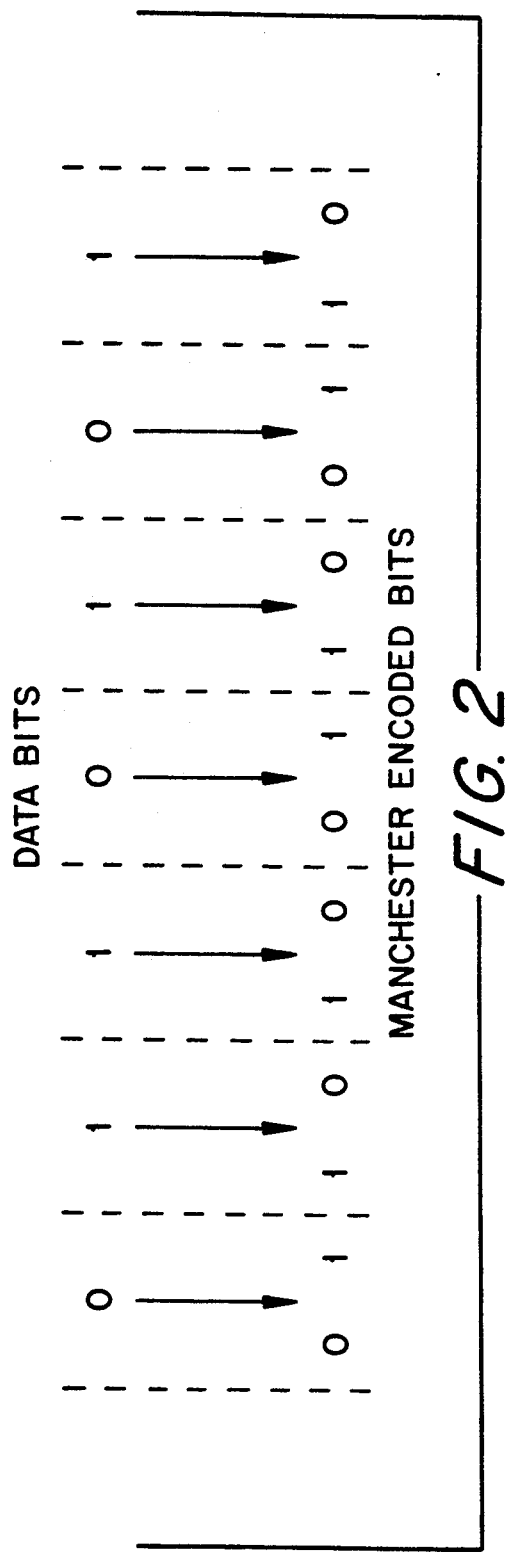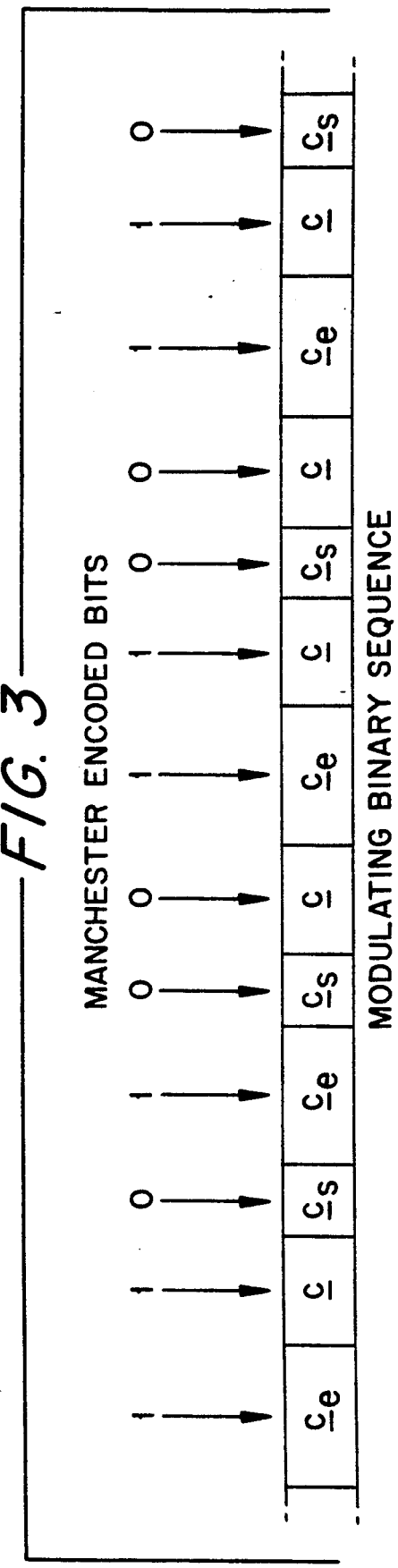

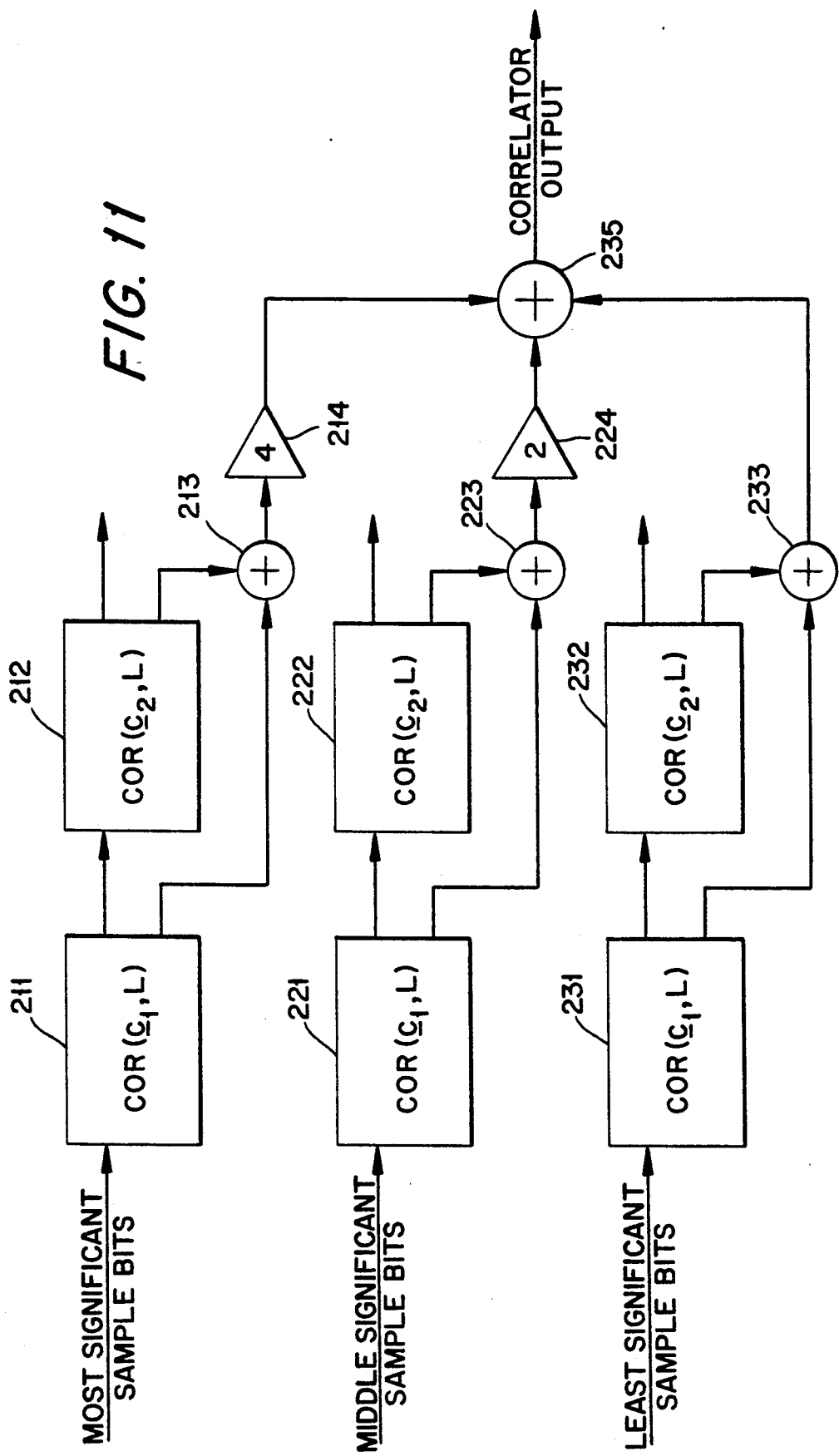

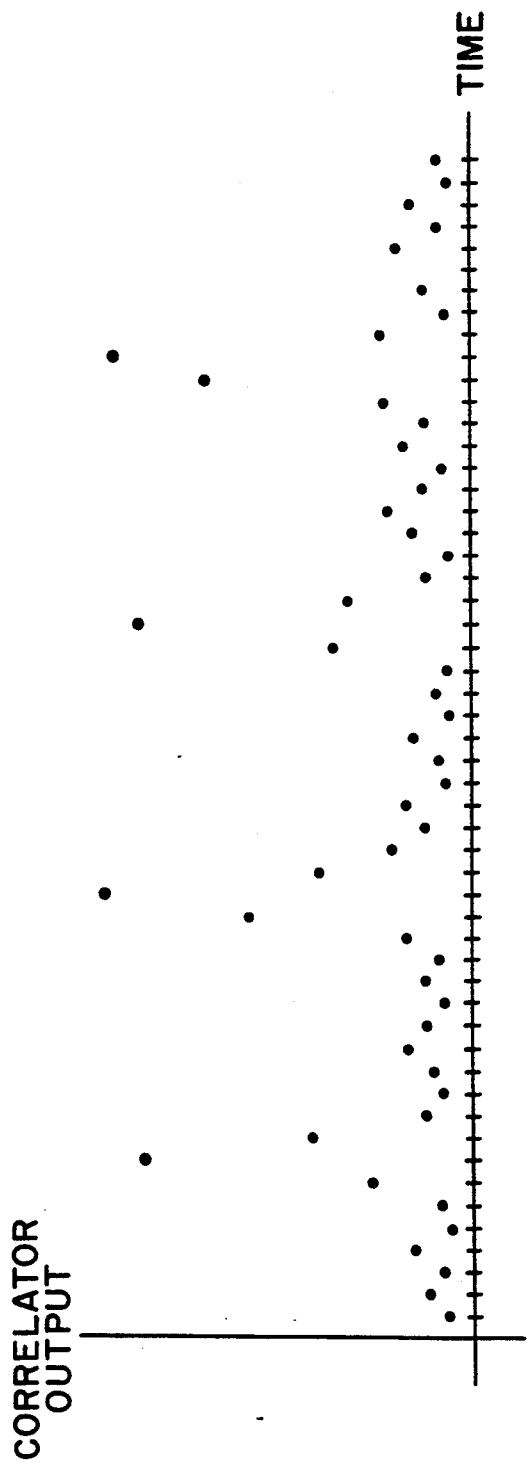

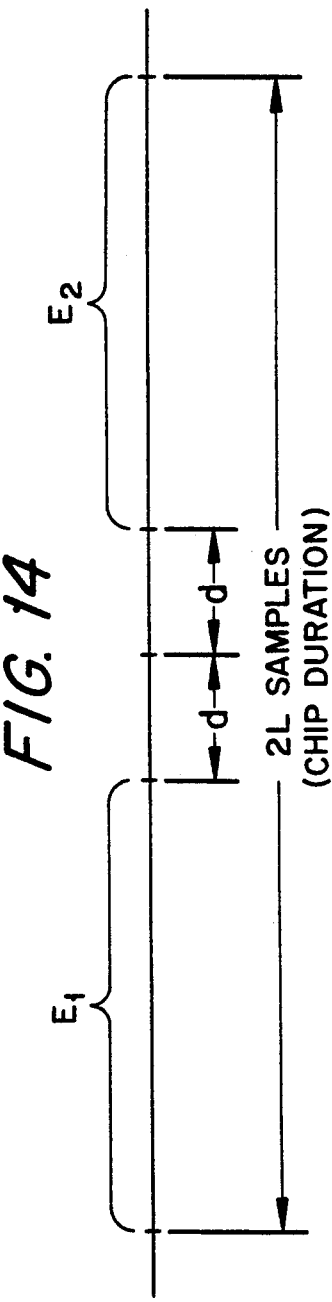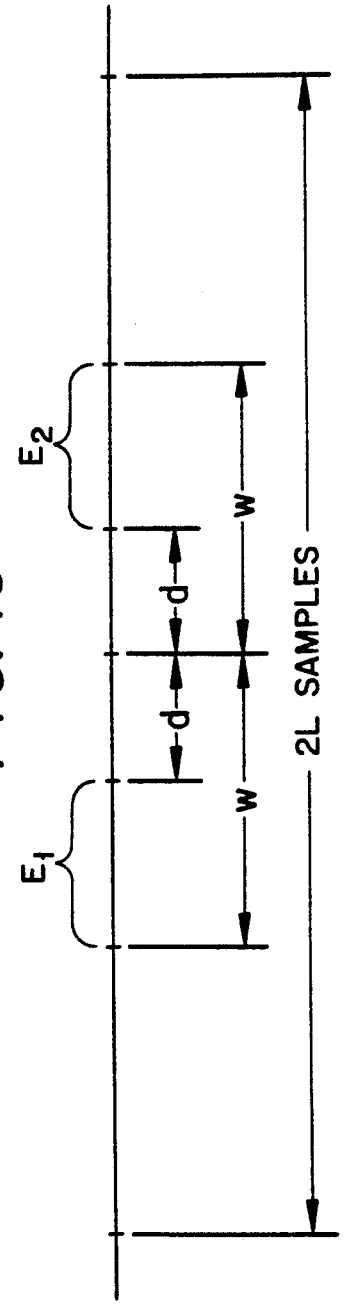

METHOD AND APPARATUS FOR THE CORRELATION OF SAMPLE BITS OF SPREAD SPECTRUM RADIO SIGNALS

This application is a divisional of application Ser. No. 528,020 filed May 20, 1990 now U.S. Pat. No. 5,166,952.

BACKGROUND OF THE INVENTION

This invention relates to the modulation and demodulation of spread spectrum radio signals, and more particularly to a spread spectrum receiver with digital filters matched to chip sequences.

DESCRIPTION OF THE PRIOR ART

Spread spectrum communication systems primarily have been used by the military to combat intentional jamming of radio and satellite communication links or to make it difficult to detect such transmitted signals. This is accomplished by spreading the transmitted signal energy over a wide bandwidth using a spreading function which is known at both the transmitter and intended receiver. The spreading function typically is defined by a binary sequence which may be pseudo randomly generated and is often referred to as the chip sequence. The binary symbols in the chip sequence are referred to as chips and it is assumed that the transmitter and intended receiver both have available the same chip sequence. The subject of spread spectrum communications is given in a three book series by Marvin K. Simon, Jim K. Omura, Robert A. Scholtz, and Barry K. Levitt, *Spread Spectrum Communications, Volume I, II, and III*, Rockville, Md.: Computer Science Press, 1985.

One of the two most common spread spectrum techniques called frequency hopping uses the chip sequence to shift over a wide bandwidth the carrier frequency of a conventional narrow band transmitter signal. The other common technique, called direct sequence spreading, directly multiplies a conventional narrow band signal by the chip sequence where the chip rate typically is much higher than the data rate. In both of these common spread spectrum techniques a conventional narrow bandwidth communications signal can be viewed as a carrier which is frequency modulated or directly multiplied by the chip sequence. There are, of course, many other types of spread spectrum systems including combinations of these two basis types in one system.

Spread spectrum signals also have been used to maintain the privacy of information and to combat multipath effects in communications channels. A complete history of these applications is given by Robert A. Scholtz, "The Origins of Spread-spectrum Communications," *IEEE Transactions on Communications*, COM 30, pp. 822-854, May 1982; Robert A. Scholtz, "Notes on Spread-spectrum History," *IEEE Transactions on Communications*, COM-31, pp. 82-84, January 1983; and Robert Price, "Further Notes and Anecdotes on Spread Spectrum Origins," *IEEE Transactions on Communications*, COM 31, pp. 85-97, January 1983.

Until recent times, the discipline of spread spectrum communications was primarily cloaked in secrecy and most of the information available on the subject could be found only in documents of a classified nature. Spread spectrum signals, however, have properties that are useful for commercial applications. Its anti-jamming capability is useful in designing a radio communication system that is less sensitive to unintentional interference. It may also allow more than one transmission signal in the same frequency and time interval where each such signal uses a different chip sequence. This is called code division multiple access (CDMA). Because the higher chip rates result in the spreading of the transmitted signal bandwidth, these radio communications systems are also more robust against multipath which makes them attractive for wireless indoor applications where multipath is often the primary source of a radio's performance limitation. Since spread spectrum signals have their energy spread over a wide bandwidth they tend to cause less interference to other narrow band communication systems.

Hewlett Packard (Payne Freret, "Wireless Terminal Communication Using Spread Spectrum Radio," *IEEE COMPCON* '80, pp. 244-248, and Payne Freret, "Application of Spread Spectrum Radio to Wireless Terminal Communication," *NTC* '80, pp. 69.71.1-4) and AT&T (Mohsen Kavehrad and George E. Bodeep, "Design and Experimental Results for a Direct-sequence Spread-spectrum Radio Using Differential Phase-shift Keying Modulation for Indoor, Wireless Communication," *IEEE Journal on Selected Areas of Communications*, SAC-5, pp. 815-823, June 1987, and Mohsen Kavehrad and Peter J. McLane, "Spread Spectrum for Indoor Digital Radio," *IEEE Communications Magazine*, Vol. 25, pp. 32-40, June 1987) have designed experimental spread spectrum radios for indoor wireless communications intended for commercial applications. They demonstrated that the spread spectrum signals have the advantage of being able to tolerate more multipath and interference than conventional narrow band radios. Both of these systems used differential binary phase shift keyed modulation with direct sequence spreading with a fixed chip code. Also, in both systems a matched filter was used to correlate the received signal with the spreading chip code. The implementation of the matched filters in both of these experimental radios were in the form of surface acoustic wave (SAW) filters matched to a fixed chip code used in the direct sequence spreading of the transmitter's signal.

Until 1985 spread spectrum modulation was implicitly prohibited by the FCC rules in all applications except the Fixed Satellite Service, where the general nature of the rules permitted it. Responding to concerns that this prohibition was inhibiting civil applications of spread spectrum radio techniques, the FCC initiated Dockets 81-413 and 81-414 in 1981 to explore possible civil uses of this technology. By 1985, through FCC General Docket No. 81-413, "Authorization of Spread Spectrum and Other Wideband Emissions not Presently Provided for in the FCC Rules and Regulations," adopted on May 9, 1985 and released on May 24, 1985, the FCC was able to permit use of this technology in three contexts: undercover use by law enforcement organizations, amateur radio use in certain bands, and low power devices in certain industrial, scientific, and medical service bands. This action was unusual in FCC history as it permitted the use of a technology prior to the Commission being petitioned for its use. This action was anticipated to have the impact of stimulating technical innovation. (See Michael J. Marcus, "Technical Deregulation: a Trend in U.S. Telecommunications Policy," *IEEE Communications Magazine*, Vol. 25, pp. 66-68, January 1987.) Today most commercial interest is in FCC Part 15.247 which allows the use of spread spectrum radios in the bands: 902 MHz-928 MHz, 2400 MHz-2483 MHz, and 5725 MHz-5850 MHz.

OBJECTS AND SUMMARY OF THE INVENTION

An object of the present invention is to provide a spread spectrum receiver using noncoherent demodulation requiring inexpensive and noncomplex circuitry.

Another object of the present invention is to provide direct sequence spread spectrum modulation using pulse position modulation.

A further object of the invention is to provide a spread spectrum modulation technique using several chip codes where a unique chip code represents each of the distinct data symbols.

An additional object of the invention is to provide a receiver using matched filters that can be implemented easily in digital circuitry.

A further object of the invention is to provide a receiver for receiving the spread spectrum signal using noncoherent reception techniques so that carrier phase acquisition and tracking are not required.

A further object of the invention is to provide a receiver that samples the in-phase and quadrature-phase baseband signals at some multiple of the chip rate so that chip clock recovery is not required.

A still further objective of the invention is to use the output of the correlator for a chip sequence to measure the signal to interference/noise ratio.

An additional object of the invention is to provide a spread spectrum system which is inexpensive and easy to implement.

According to the present invention, as embodied and broadly described herein, a spread spectrum modulator for use on a data bit sequence is provided comprising generating means, substituting means, inverting means, and modulating means. The generating means generates a Manchester bit sequence from the data bit sequence by encoding each bit of the data bit sequence with Manchester encoding bits. The substituting means is responsive to each pair of bits, a first bit and a second bit, in the Manchester bit sequence. The substituting means substitutes for the second bit in the Manchester bit sequence a normal chip code for the second bit when the first bit and second bit are identical. The substituting means substitutes for the second bit in the Manchester bit sequence a shortened chip code for the second bit when the first bit and the second bit are a "1" bit followed by a "0" bit. The substituting means substitutes for second bit in the Manchester bit sequence an extended chip code for the second bit when the first bit and second bit are a "0" bit followed by a "1" bit. The substituting means thereby generates a sequence of concatenated codes, comprising normal chip codes, shortened chip codes, and extended chip codes. The inverting means pseudo randomly inverts the sequence of concatenated codes. The modulation means modulates a carrier signal with the pseudo randomly inverted sequence of concatenated codes.

The present invention also includes a spread spectrum modulator for use on a data symbol sequence comprising substituting means and modulating means. The substituting means is responsive to each symbol of the data symbol sequence for substituting a corresponding chip code for each corresponding data symbol of the data symbol sequence. The modulating means is coupled to the substituting means and is responsive to each chip code for modulating a carrier signal.

A first spread spectrum receiver, as taught by the present invention, demodulates a spread spectrum signal having a concatenated sequence of shortened chip codes, extended chip codes and normal chip codes. The first receiver comprises receiving means, first sampling means, second sampling means, correlator means, acquiring and tracking means, and detecting means. The receiving means receives the spread spectrum signal and generates an in-phase signal and a quadrature-phase signal. The first sampling means repetitively samples the in-phase signal at twice, or more than twice, the chip rate of the spread spectrum signal for generating, from two samples, or more, per chip of the in-phase signal, a plurality of in-phase samples. The second sampling means repetitively samples the quadrature-phase signal at twice, or more than twice, the chip rate of the spread spectrum signal, and generates, from the two, or more, samples per chip of quadrature-phase signal, a plurality of quadrature-phase samples.

In response to a normal correlator chip code, the correlator means correlates the plurality of in-phase samples with the normal chip code to generate a in-phase correlator signal. The same number of in-phase samples as have been sampled per chip by the first sampling means, are correlated with one chip of the normal chip code, respectively. The results of each of these correlations per chip of the normal chip code are then summed. The correlator means also correlates the plurality of quadrature-phase samples with the normal correlator chip code to generate a quadrature-phase correlator signal. The same number of quadrature-phase samples as have been sampled per chip by the second sampling means, are correlated with one chip of the normal chip code, respectively. The results of each of these correlations per chip of the normal chip code are then summed.

In a preferred embodiment, the normal correlator chip code is identical to the normal chip code as used with the transmitted spread spectrum signal. The correlator means generates an output correlation signal from the square root of the sum of: the square of the in-phase correlator signal; plus, the square of the quadrature-phase correlator signal.

The acquiring and tracking means acquires and tracks the output correlation signal, to generate a reference timing signal. The detecting means, in response to comparing the output correlation signal with the referenced timing signal, detects the timing of the output correlation signal thereby decoding the output correlation signal. The timing of the output correlation signal determines whether a shortened chip code, normal chip code or extended chip code was received by the first spread spectrum receiver.

The present invention includes a second spread spectrum receiver for demodulating a spread spectrum signal having a sequence of concatenated first and second chip codes comprising receiver means, first sampling means, second sampling means, first correlator means, and second correlator means, acquiring and tracking means, and detecting means. The receiver means, receives the spread spectrum signal and generates an in-phase signal and a quadrature-phase signal. The first sampling means repetitively samples the in-phase signal at twice, or more than twice, the chip rate of the spread spectrum signal and generates, from the first and second, or more, samples per chip of the in-phase signal, a first plurality of in-phase samples. The second sampling means repetitively samples the quadrature-phase signal at twice, or more than twice, the chip rate of the spread spectrum signal and generates, from first and second, or more, samples per chip of the quadrature-phase signal, a plurality of quadrature-phase samples. The first correlator means correlates the plurality of in-phase samples and the plurality of quadrature-phase samples with a first correlator chip code, thereby generating a first correlation signal. The same number of in-phase samples as have been sampled per chip by the first sampling means, are correlated with one chip of the first correlator chip code, respectively. The results of each of these correlations per chip of the first correlator chip code are then summed. The second correlator means correlates the plurality of in-phase samples and the plurality of quadrature-phase samples with a second correlator chip code, thereby generating a second correlation signal. The same number of quadrature-phase samples as have been sampled per chip by the second sampling means, are correlated with one chip of the second correlator chip code, respectively. The results of each of these correlations per chip of the second correlator chip code are then summed. In general, the first and second correlation means generates the first and second correlation signals from the square root of the sum of the square of the in-phase correlation signal plus the square of the quadrature phase correlation signal.

The acquiring and tracking means acquires and tracks the sum of the in-phase and quadrature-phase components for each code.

The spread spectrum receiver as taught herein may be extended for demodulating a spread spectrum signal having a sequence of concatenated first, second, third and fourth chip codes, or even more chip codes. Such receiver would require additional correlator means, and appropriate detection circuitry, as taught by this patent.

Another aspect of the present invention includes a 1-bit correlator comprising first storing means, first comparing means, and first adding means. The first storing means stores a first plurality of 1-bit sample bits. The first comparing means compares the first plurality of 1-bit sample bits with a first plurality of code chips to generate a first plurality of output signals. The first adding means adds the first plurality of output signals to generate a first correlation signal.

The 1-bit correlator may further include second storing means, second comparing means, second adding means, and third adding means. The second storing means stores a second plurality of 1-bit samples. The second comparing means compares the second plurality of 1-bit samples with a second plurality of code chips to generate a second plurality of output signals. The second adding means generates a second correlation signal from the second plurality of output signals. The third adding means adds the first correlation signal with the second correlation signal to generate a third correlation signal.

Additional objects and advantages of the invention will be set forth in part in the description in part which follows, and in part will be obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings which are incorporated in and constitute a part of this specification, illustrate particular embodiments of the invention, and together with the description, serve to explain the principles of the invention.

FIG. 1A illustrates a spread spectrum pulse position modulator according to the present invention;

FIG. 2 illustrates the Manchester encoding of data bits;

FIG. 3 shows an example of a Manchester encoded bit sequence and the resulting sequence of concatenated codes;

FIG. 6C is a block diagram of a noncoherent correlator;

FIG. 11 illustrates six 1-bit sample correlators of the present invention to form a single 3-bit sample correlator of a longer code by combining most significant sample bits, middle significant sample bits, and least significant sample bits;

FIG. 12 illustrates a transmitted periodic sequence of a single chip code;

FIG. 13 shows the output of a correlator for the sequence of FIG. 12 with a signal and noise input;

FIG. 14 illustrates the error term for a phase locked loop code acquisition mode using the difference of correlator output samples of the first half of a chip code time interval less the correlator output samples of the second half of a chip code time interval;

FIG. 15 illustrates the reduced sampling window of the phase locked loop for code tracking after acquisition has been accomplished;

DETAILED DESCRIPTION OF THE PREFERRED EMBODIMENTS

Figure 1B:
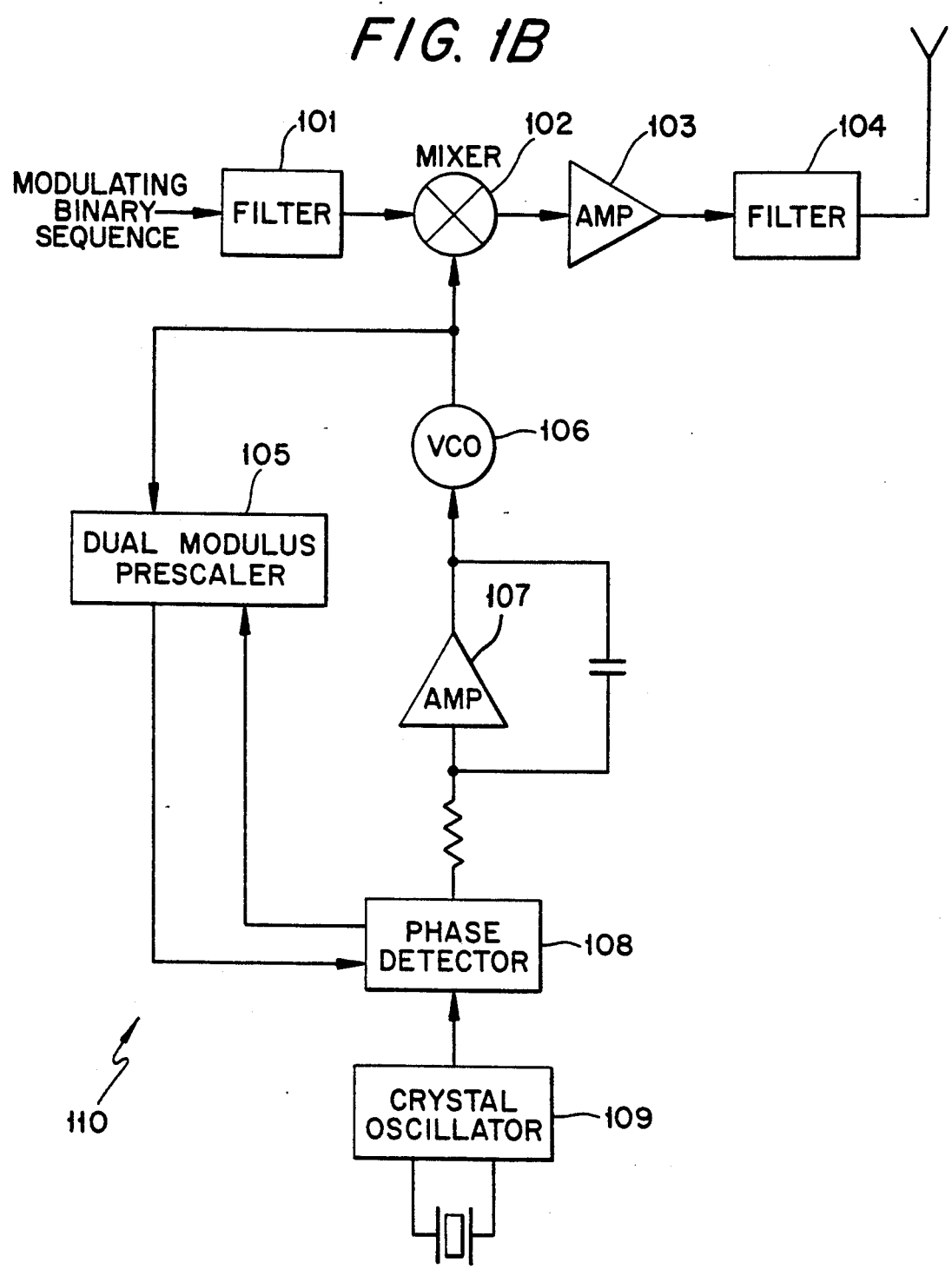
FIG. 1B is a block diagram of the radio frequency (RF) portion of a modulator.

Reference will now be made in detail to the present preferred embodiments of the invention, examples of which are illustrated in the accompanying drawings.

In the exemplary arrangement shown in FIG. 1A, a first species of the present invention includes a spread spectrum modulator for use on a data bit sequence comprising generating means, substituting means, inverting means, and modulating means. As illustrated in FIG. 1A, the generating means may be embodied as a Manchester generator 112, the substituting means may be embodied as a chip-code device 113, the inverting means may be embodied as an inverting device 114, and the modulating means may be embodied as an RF modulator 115. The Manchester generator 112 is coupled to the chip-code device 113, the chip-code 113 is coupled to the inverting device 114, and the inverting device 114 is coupled to the RF modulator 115.

The Manchester generator 112 generates a Manchester bit sequence from the data bit sequence by encoding each data bit of the data bit sequence with Manchester encoding bits. As shown in FIG. 2, a first row of a data bit sequence is shown comprising bits as "0110101." Also shown below each data bit are Manchester encoded bits. Each "0" bit of the data bit sequences is encoded as a "01" Manchester encoded bit, and each "1" bit of the data bit sequence is encoded as a "10" Manchester encoded bit. Accordingly, the data bit sequence as shown in FIG. 2 is encoded as the following bits: 01101001100110.

The Manchester bit sequence is passed to the chip-code device 113. The chip-code device 113 is responsive to each pair of bits, a first bit and a second bit, in the Manchester bit sequence. The chip-code device 113 substitutes for the second bit of the pair of bits in the Manchester bit sequence a normal chip-code for the second bit when the first bit and the second bit of the pair of bits are identical. The chip-code device 113 substitutes for the second bit of the pair of bits in the Manchester bit sequence a shortened chip-code for the second bit when the first bit and the second bit of the pair of bits are a "1" bit followed by a "0" bit. The chip-code device 113 substitutes for the second bit of the pair of bits of the Manchester bit sequence an extended chip-code for the second bit when the first bit and the second bit of the pair of bits are a "0" bit followed by a "1" bit. The chip-code device 113 thereby generates a sequence of concatenated codes, comprising normal chip-codes, shortened codes and extended chip-codes. The inverting device 114 which is coupled to the chip-code device 113, pseudorandomly inverts the sequence of concatenated codes. The RF modulator 115 which is coupled to the inverting device 114 modulates a carrier signal with the pseudo randomly inverted sequence of concatenated codes. FIG. 1B illustrates an embodiment of a RF modulator 110 according to the present invention.

The present invention includes an RF modulator 110, as shown in FIG. 1B, for modulating a data bit sequence by a carrier signal. The RF modulator 110 includes a first filter 101, a mixer 102, a power amplifier 103, and a second filter 104. Also included are a crystal oscillator 109, phased detector 108, operational amplifier 107, voltage control oscillator 106, and dual modulus prescaler 105. The first filter 101 is coupled to the mixer 102 and to the power amplifier 103 and the second filter 104. The crystal oscillator 109 is coupled to the phase detector 108, which is then coupled to the operational amplifier 107 and the voltage control oscillator 106, which has feedback through the dual modulus prescaler 105, to the phased detector 108. The output of the voltage control oscillator 106 is the carrier signal which modulates the data bit sequence using mixer 102.

In operation a data bit sequence passes through the first filter 101 and is mixed by the mixer 102 with the carrier signal. The carrier signal is generated by the crystal oscillator 109, and stabilized with the phase detector 108, the power amplifier 107, the voltage control oscillator 106 and the dual modulus prescaler 105. The output of the voltage control oscillator 106 modulates the data bit sequence at mixer 102. The output of the mixer 102 is a modulated carrier signal with the data bit sequence.

The pulse position modulation scheme as taught herein is primarily applied to a data bit sequence that is Manchester encoded. Thus a "0" data bit is Manchester encoded into the pair of bits "01" while a "1" data bit is Manchester encoded into the pair of bits "10". Such encoding doubles the bit rate but ensures that there are sufficient transitions to allow a receiver to maintain synchronization on bit times. The Manchester encoding of data bits is illustrated in FIG. 2 for a typical data bit sequence.

For the spread spectrum pulse position modulation scheme a fixed binary sequence of L binary symbols called the chip code is used. Here we denote the chip code by the L bit binary vector $$\underline{c} = (c_1, c_2, c_3, \ldots, c_L)$$

where $c_k$ is the $k^{th}$ chip which is a binary symbol having value of "A" or "−A". This basic chip code is shortened by b chips to form a shortened code given by $$\underline{c}_s = (c_{b+1}, c_{b+2}, \ldots, c_L)$$

and lengthened by b bits, $d_1, d_2, \ldots, d_b$, to form the extended code given by $$\underline{c}_e = (d_1, d_2, \ldots, d_b, c_1, c_2, \ldots, c_L).$$

Thus the normal code c has L bits, the shortened code $c_s$ has L−b bits, and the extended code $c_e$ has L+b bits.

The pulse position modulation scheme thus generates a sequence of concatenated codes comprising a continuous cascade of the three types of codes. The code used depends on the Manchester encoded bit sequence where the following rule applies:

Send the normal chip code $\underline{c}$ when "0" follows "0" or when "1" follows "1".

Send the shortened chip code $\underline{c}_s$ when "0" follows "1".

Send the extended chip code $\underline{c}_e$ when "1" follows "0".

The resulting sequence of concatenated codes directly modulates a carrier signal as shown in FIG. 1B.

An example of a Manchester bit sequence and the resulting code sequence which forms the modulating bit sequence is illustrated in FIG. 3. Note that the average length of the codes in the sequence of codes following an encoded "0" and ending in another encoded "0" is exactly length L. Since Manchester encoding forces a "0" bit to occur at least once every three encoded bits the average length of the short sequences of codes tends to be L or close to L.

This is a pulse position modulation scheme where there is an average periodic pulse position point defined such that for every L transmitted binary symbols there is a reference point defined. In every L transmitted symbols there is a pulse which is shifted in one of two positions relative to this reference.

Multiple Chip Code Modulation

In another form of modulation in this invention two distinct chip codes of length L are used. The present invention also includes a spread spectrum modulator for use on a data bit sequence comprising substituting means, inverting means, and modulating means. This is illustrated in FIG. 1A without the Manchester generator. It comprises the chip-code device 113, and inverting device 114. The substituting means may be embodied as a chip-code device and the modulator means may be embodied as an RF modulator. The chip-code device in this aspect of the invention examines each bit of the data bit sequence, and substitutes a first chip code for each bit of the data bit sequence when each bit is a 1-bit, and substitutes a second chip code for each bit of the data bit sequence when each bit is a 0-bit. Accordingly, the chip-code device generates a sequence of concatenated first and second chip-codes. The inverting device which is coupled to the chip code device, pseudorandomly inverts the sequence of concatenated codes. The modulator is coupled to the inverting device and modulates the sequence of concatenated and inverted first and second chip-codes with a carrier signal. Accordingly, the two chip codes represent one information data bit, each.

Figure 4:
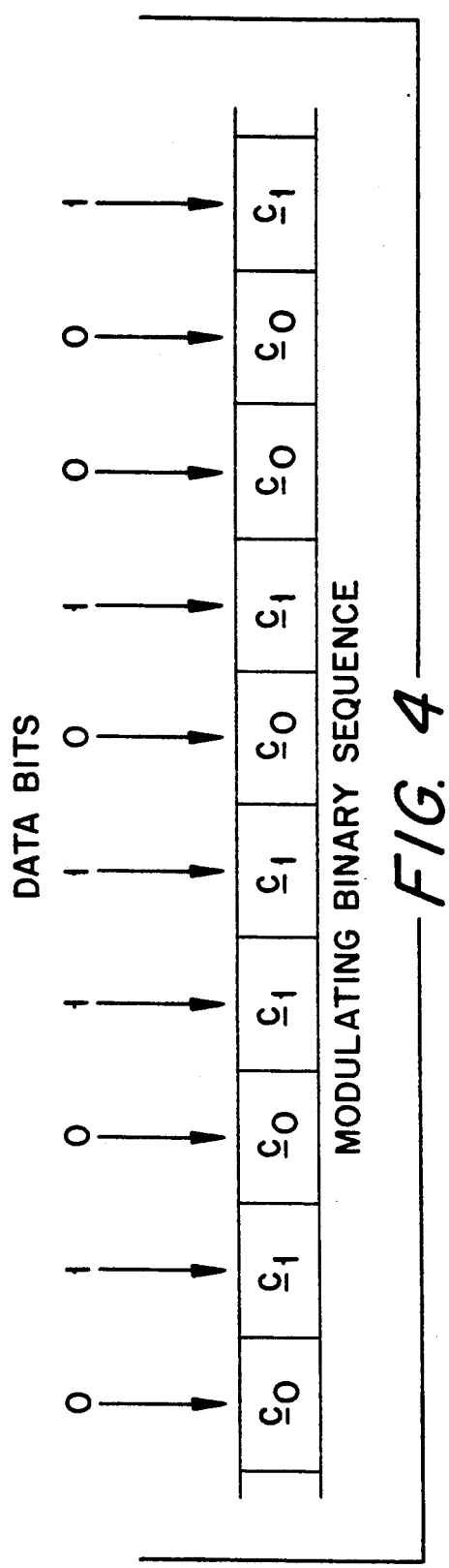
FIG. 4 shows the substitution of chip codes per one information bit.
Figure 5:
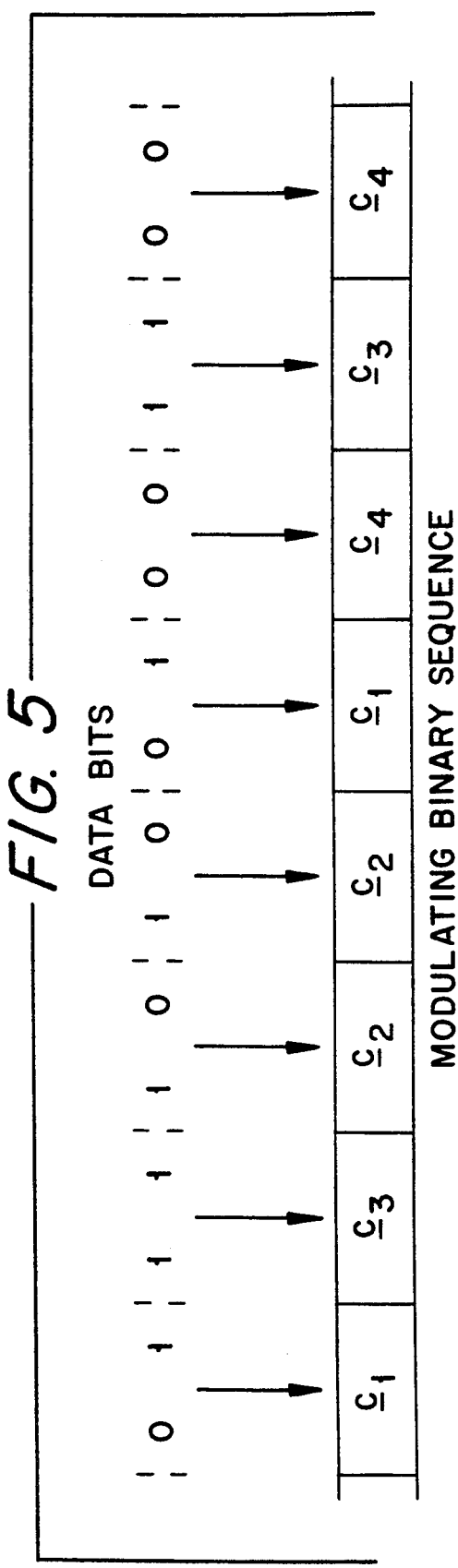
FIG. 5 shows the substitution of chip codes per one of four data symbols.

As shown in FIG. 4, the continuous binary sequence that modulates the carrier includes the concatenation of the two chip codes, $c_0$ and $c_1$, of L binary symbols each to convey the sequence of information data bits. Four chip codes, $c_1$, $c_2$, $c_3$, and $c_4$, can be used to convey two information data bits, or four data symbols for each chip code of length L. This is illustrated in FIG. 5 where the binary sequence modulating the carrier consists of a concatenation of these four chip codes where each chip code is specified by two information data bits. This can be easily generalized to many more chip codes of length L representing a larger number of distinct information data symbols.

The present invention in a preferred embodiment accordingly uses two types of direct sequence spread spectrum modulation. One is a pulse position modulation technique where each pulse includes a chip code modulating a carrier. Here the position of the pulses represent the transmitted Manchester encoded data bits. The second modulation technique uses several chip codes where a unique chip code represents each of the distinct data symbols. This invention thus uses two unique direct sequence spread spectrum modulation techniques:

In the pulse position modulation scheme the data bits are Manchester encoded. The encoded bits are then represented by the position of a basic chip code in a sequence of chips and filler bits which modulate a carrier.

In the multiple chip code scheme several chip codes are used where each unique information data symbol is represented by a unique chip code which directly modulates a carrier.

To spread the spread spectrum signal's power more uniformly across the band, the polarity of the transmitted chip codes can be controlled by a pseudorandom sequence generator. This has no impact on the receiver since it is noncoherent.

The receivers for both of the two modulations use matched filters that are implemented in a digital circuit. This circuit can be programmed to be matched to any chosen chip sequence. Noncoherent reception is used so that there is no carrier recovery necessary. Chip time recovery is also not required due to a double sampling scheme. In both types of receivers the chip sequence acquisition and tracking is implemented by a digital circuit. The key properties of the receivers in this invention are:

Noncoherent reception techniques are used so that there is no carrier phase acquisition and tracking.

Sampling the received signal's in-phase and quadrature components at twice the chip rate eliminates the need for chip time acquisition and tracking.

In one implementation the alternate samples of twice the chip rate are separately correlated with the chip codes and non-coherently combined to more effectively combat multipath.

Matched filters that are matched to the chip codes are implemented in a digital circuit.

Acquisition and tracking of the chip code arrival times at the receiver is implemented in a digital circuit.

The matched filter circuit is implemented in a digital IC.

The acquisition and tracking circuit is implemented in a digital IC.

The receivers' demodulator implementation is based on a modular design where the matched filter IC and acquisition/tracking IC form building blocks. The same ICs can be used in different configurations for the demodulator of the two types of spread spectrum modulation for various data rates, processing gain, and quantization levels of the baseband samples.

The digital implementations of the basic matched filter circuit as an IC and the acquisition and tracking circuit as another IC provide flexibility in design. These digital ICs can be combined in a variety of ways to implement receivers for each type of modulation. Once a production system is tested with these ICs then a final single integrated IC can be implemented to include all the digital circuits in the receiver.

Scrambling the Chip Codes

In both the above modulation techniques there is a sequence of chip codes that are concatenated to form a binary sequence that modulates a carrier. Each chip code can be inverted using an inverting device 114 as shown in FIG. 1A without any impact to the noncoherent receivers in this invention. By inverting or not inverting a chip code in the modulating binary sequence according to some pseudo random bit sequence generator of the transmitted signal, the power spectrum changes. The scrambling of the chip codes results in a more uniform distribution of the power spectrum of the transmitted signal.

Spread Spectrum Radio Receivers

A second aspect of the present invention includes a spread spectrum receiver for demodulating a spread spectrum signal having a concatenated sequence of shortened chip codes, extended chip codes and normal chip codes. The spread spectrum receiver comprises receiving means, first sampling means, second sampling means, correlator means, acquiring and tracking means, and comparing means. As illustratively shown in FIG. 6A, the receiving means may be embodied as RF section 121, the first sampling means may be embodied as in-phase sampler 122, the second sampling means may be embodied as quadrature-phase sampler 125, the correlator means may be embodied as correlator 124, the acquiring and tracking means may be embodied as code acquisition and tracking circuit 129, and the comparing means may be embodied as detection circuit 130.

The in-phase sampler 122 and quadrature-phase sampler 125 are coupled to the RF section, which receives the spread spectrum signal. The correlator 124 is coupled to the in-phase sampler 122 and quadrature-phase sampler 125. The code acquisition and tracking circuit 129 is coupled to the correlator 124, and the detection circuit 130 is coupled to the correlator 124 and the code acquisition and tracking device 129. The detection circuit 130 outputs the decoding of the correlation signal.

The RF section 121 receives the spread spectrum signal and generates an in-phase signal and a quadrature-phase signal. The in-phase sampler 122 samples the in-phase signal, thereby generating a plurality of in-phase samples. The in-phase sampler may sample the in-phase signal at twice, or more than twice, the chip rate of the spread spectrum signal for generating, from two samples, or more, per chip, the plurality of in-phase samples. The quadrature-phase sampler 125 samples the quadrature-phase signal, thereby generating a plurality of quadrature-phase samples. The quadrature-phase sampler may sample the quadrature-phase signal at twice, or more than twice, the chip rate of the spread spectrum signal for generating, from two samples, or more, per chip, the plurality of quadrature-phase samples.

Figure 6A:
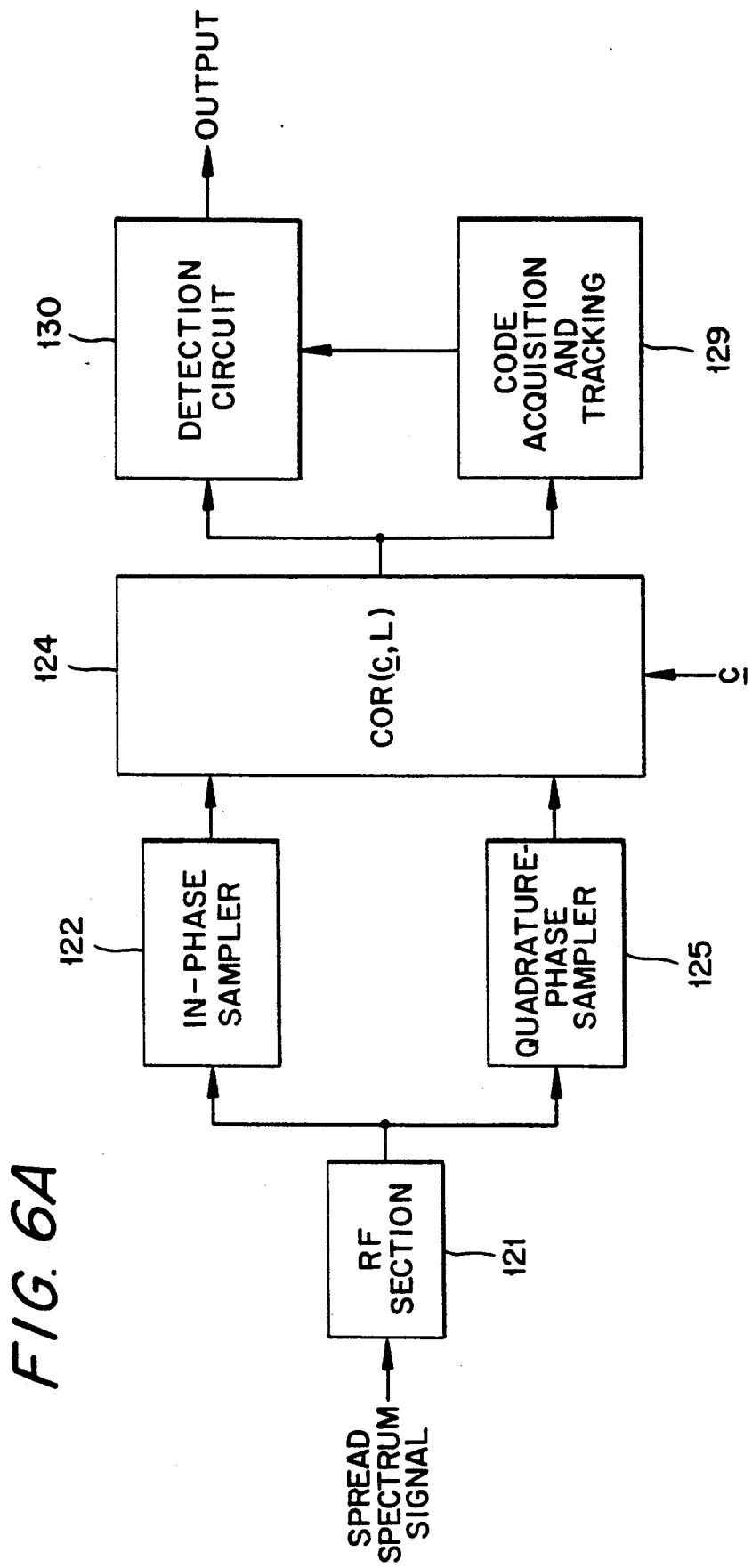
FIG. 6A is a block diagram of a pulse position demodulator according to the present invention.

The correlator 124 of FIG. 6A is shown in FIG. 6C as correlator 127. In response to a chip code, which is stored as input vector $c$, an in-phase digital correlator 116 correlates the plurality of in-phase samples with the chip code, $c$, to generate an in-phase correlator signal. The number of in-phase samples as have been sampled per chip by the in-phase sampler 122, are correlated with one chip of the chip code, $c$. The results of each of these correlations per chip of the chip code, $c$, are then summed to generate the in-phase correlator signal. In a preferred embodiment, the chip code is identical to the chip code as used with the transmitted speed spectrum signal.

An alternative embodiment may have the number of in-phase samples as have been sampled per chip by the in-phase sampler 122, summed together and then correlate the sum with one chip of the chip code. The results of each of the correlated sums are then added together to generate the in-phase correlator signal.

A quadrature-phase digital correlator 117 correlates the plurality of quadrature-phase samples with the same chip code to generate a quadrature-phase correlator signal. The same number of in-phase samples as have been sampled per chip by the quadrature-phase sampler 125, are correlated with one chip of the chip code, $c$, respectively. The results of each of these correlations per chip of the chip code, $c$, are then summed to generate the quadrature-phase correlator signal.

An alternative embodiment may have the number of quadrature-phase samples as have been sampled per chip by the quadrature-phase sampler 125, summed together and then correlate the sum with one chip of the chip code. The results of each of the correlated sums are then added together to generate the quadrature-phase correlator signal.

The correlator 127 further generates 118 an output correlation signal which is the square root of the sum of the square of the in-phase correlator signal plus the square of the quadrature-phase correlator signal.

The code acquisition and tracking circuit 129 of FIG. 6A, in response to acquiring and tracking the output correlation signal, generates a reference timing signal. In response to comparing the output correlation signal with the reference timing signal, the detection circuit 130 detects the timing of the output correlation signal with respect to the reference timing signal, and thereby decodes the output correlation signal. Accordingly, the timing of the output correlation signal determines whether a shortened chip code, extended chip code, or normal chip code was received by the spread spectrum receiver.

The present invention, as embodied in FIG. 6A, includes a method using a spread spectrum receiver for demodulating a spread spectrum signal having a concatenated sequence of shortened chip codes, extended chip codes, and normal chip codes. The method comprises, using the spread spectrum receiver, of receiving the spread spectrum signal and generating and in-phase signal and a quadrature-phase signal; sampling repetitively the in-phase signal, thereby generating a plurality of in-phase samples; sampling repetitively the quadrature-sample, thereby generating a plurality of quadrature-phase samples; correlating the plurality of in-phase samples with a normal correlator chip code to generate an in-phase correlator signal; correlating the plurality of quadrature-phase samples with the normal correlator chip code to generate a quadrature-phase correlator signal; generating an output correlation signal which is the square root of the sum of the square of the in-phase correlator signal plus the square of the quadrature-phase correlator signal; acquiring and tracking the output correlation signal, thereby generating a reference timing signal; and detecting the timing of the output correlation signal with respect to the reference timing signal, thereby decoding the output correlation signal.

The method and apparatus of FIG. 6A may further include having the first sampling step sample the in-phase signal at twice, or more than twice, the chip rate of the spread spectrum signal and adding the two or more samples per chip of the spread spectrum signal to generate the plurality of in-phase samples. Further, the method and apparatus may include having the second sampling step sample the quadrature-phase signal at twice, or more than twice, the chip rate of the spread spectrum signal and adding the two or more samples per chip of the spread spectrum signal to generate the plurality of quadrature-phase samples.

Additionally, the method and apparatus may include having the sampling steps sample repetitively the in-phase signal at twice, or more than twice the chip rate of the spread spectrum signal for generating, from first and second, or more, samples per chip of the in-phase signal, a first plurality of in-phase samples and a second plurality of in-phase samples, respectively. The method and apparatus may include sampling repetitively the quadrature-phase signal at twice, or more than twice, the chip rate of the spread spectrum signal for generating, from first and second samples per chip of the quadrature-phase signal, a first plurality of quadrature-phase samples and a second plurality of quadrature-phase samples, respectively. Accordingly, the apparatus may include first, second, third and fourth correlating means. The first correlating means correlates the first plurality of in-phase samples with the normal correlator chip code to generate a first in-phase correlator signal. The second correlating means correlates the second plurality of in-phase samples with the normal correlator chip code to generate a second in-phase correlator signal. The third correlating means correlators the first plurality of quadrature-phase samples with the normal correlator chip code to generate a first quadrature-phase correlator signal. The fourth correlating means correlates the second plurality of quadrature-phase samples with the normal correlator chip code to generate a second quadrature-phase correlator signal. Accordingly, an output correlation signal may be generated from the square root of the sum of the square of the first in-phase correlator signal, the square of the second in-phase correlator signal, the square of the first quadrature-phase correlator signal, plus the square of the second quadrature-phase correlator signal. The code acquisition and tracking device 129 can acquire and track the first and second in-phase correlator signals and the first and second quadrature-phase signals correlator. The detection circuit 130 detects the timing of the first and second in-phase correlator signals and the first and second quadrature-phase correlator signals with respect to the reference timing signal, thereby decoding the first and second in-phase correlator signals and the first and second quadrature-phase correlator signals.

Figure 6B:
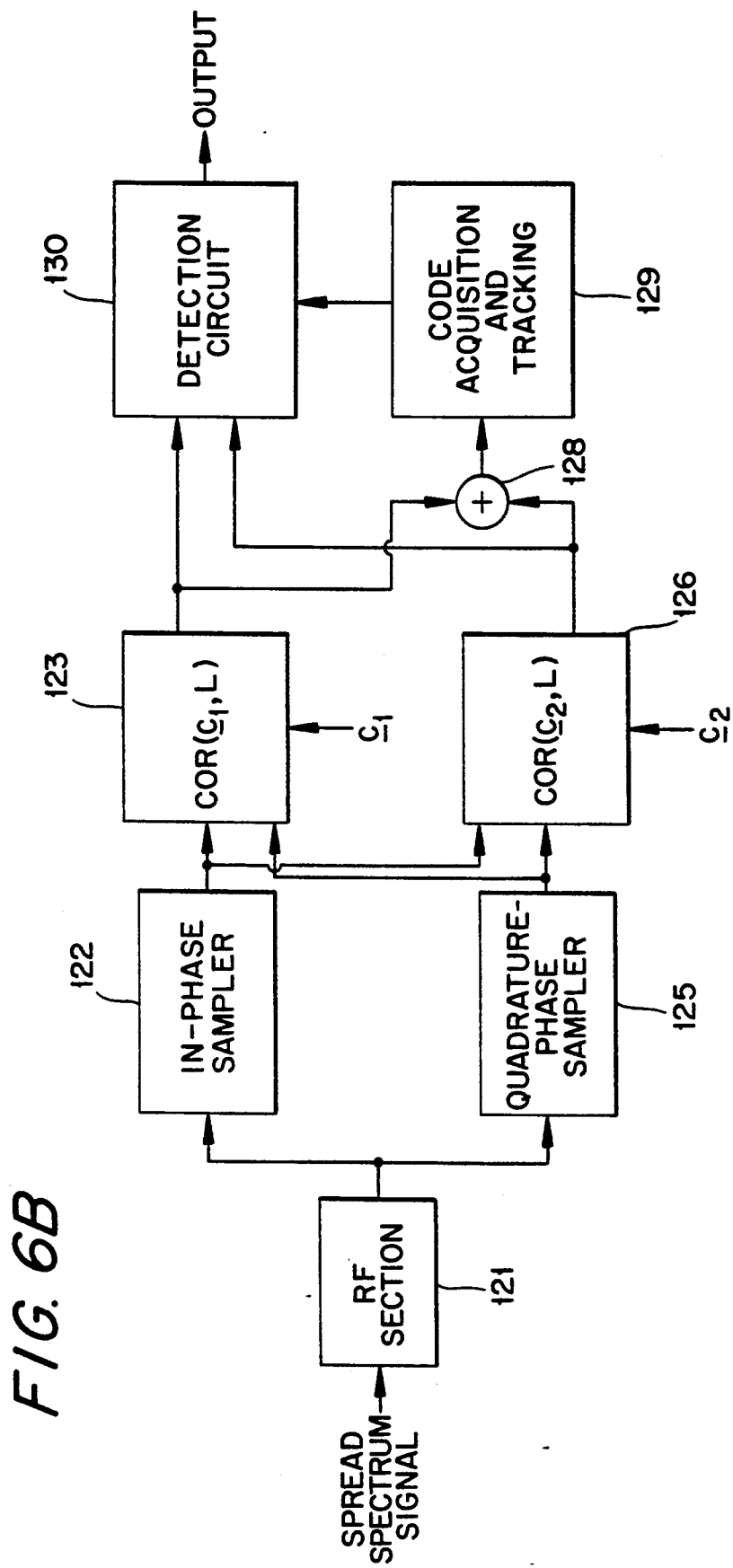
FIG. 6B is a block diagram of a two code scheme demodulator according to the present invention.

A second spread spectrum receiver of the present invention is illustratively shown in FIG. 6B. The spread spectrum receiver as shown is for demodulating a spread spectrum signal having a sequence of concatenated first and second chip codes. The spread spectrum receiver includes radio receiver means, first sampling means, second sampling means, first correlator means, second correlator means, acquiring a tracking means, and detecting means. The receiver means may be embodied as RF section 121, the first sampling means may be embodied as in-phase sampler 122, the second sampling means may be embodied as quadrature-sampler 125, the first correlator means may be embodied as correlator 126, the second correlator means may be embodied as correlator 126, the acquiring and tracking means may be embodied as code acquisition and tracking circuit 129, and the detecting means may be embodied as detection circuit 130. The spread spectrum signal is received by RF section 121. The RF section 121 is coupled to the in-phase sampler 122 and the quadrature-sampler 125. The first correlator 123 is coupled to the in-phase sampler 122 and to the quadrature-sampler 125. The second correlator 126 is coupled to the in-phase sampler 122 and the quadrature-phase sampler 125. The code acquisition and tracking circuit is coupled to an adder 128 and to the first correlator 123 and the second correlator 126. The detection circuit is coupled to the first correlator 123 and to the second correlator 126, and also to the code acquisition and tracking circuit 129.

The RF section 121 receives the spread spectrum signal and generates an in-phase and quadrature-phase signal. The in-phase sampler 122 repetitively samples the in-phase signal, thereby generating a plurality of in-phase samples. The quadrature phase sampler 125 repetitively samples the quadrature-phase signal, thereby generating a plurality of quadrature-phase samples. The first correlator 123 correlates the in-phase samples and the quadrature-phase samples with a first correlator chip code, $c_1$, thereby generating a first correlation signal. The second correlator 126 correlator the in-phase samples and the quadrature-phase samples with a second correlator chip code, $c_2$, thereby generating a second correlation signal. First and second correlators 123, 126, may be embodied as correlator 127 of FIG. 6C, and function as described previously.

The summer 128 combines the first correlation signal and the second correlation signal. The code acquisition and tracking circuit 129 acquires and tracks the combined correlation signal, thereby generating a reference signal. In response to the timing from the reference signal, the detection circuit 130 compares the first correlation signal with the second correlation signal, thereby outputting a first or second data bit.

The present invention may further include having the spread spectrum receiver for demodulating a spread spectrum signal having a sequence of concatenated first, second, third, and fourth chip codes. In addition to the circuit shown in FIG. 6B, the spread spectrum receiver includes third correlator means and fourth correlator means. The third and fourth correlator means may be embodied as third and fourth correlators. The third correlator correlates the in-phase samples and the quadrature-phase samples with a third correlator chip code, $c_3$, thereby generating a third correlation signal. The fourth correlator correlates the in-phase samples and the quadrature-phase samples with a fourth correlator chip code, $c_4$, thereby generating a fourth correlation signal. The code acquisition and tracking circuit 129 accordingly acquires and tracks the sum of the first correlation signal, the second correlation signal, the third correlation signal and the fourth correlation signal, to generate a reference signal. Accordingly, the detection circuit 130, in response to the reference signal, compares the first correlation signal, the second correlation signal, the third correlation signal and the fourth correlation signal, for outputting a first data symbol, a second data symbol, a third data symbol or a fourth data symbol, corresponding to the first, second, third or fourth correlation signal, respectively, having the greatest value.

The in-phase sampler of FIGS. 6A, and 6B, may have the in-phase sampler 122 sample the in-phase signal at twice, or more than twice, the chip rate of the spread spectrum signal to generate a plurality of in-phase samples. In this embodiment, the correlator, which may be a plurality of shift registers, correlates the number of samples per chip of the plurality of in-phase samples, with one chip of the spread spectrum chip code. Also, the quadrature-phase sampler 125 may sample the quadrature-phase signal at twice, or more than twice, the chip rate of the spread spectrum signal to generate a plurality of quadrature-phase samples. In this embodiment, the correlator, which may be a plurality of shift registers, correlates the number of samples per chip of the plurality of quadrature-phase samples, with one chip of the spread spectrum chip code. For the pluralities of the in-phase and quadrature-phase samples, the correlator may have sufficient registers for correlating the pluralities of the in-phase and quadrature phase samples with an entire chip sequence at one time.

Alternatively, the in-phase sampler of FIGS. 6A, and 6B, may have the in-phase sampler 122 sample the in-phase signal at twice, or more than twice, the chip rate of the spread spectrum signal and add the two or more samples per chip of the spread spectrum signal to generate the plurality of in-phase samples. Also, the quadrature-phase sampler 125 may sample the quadrature-phase signal at twice, or more than twice, the chip rate of the spread spectrum signal and add the two or more samples per chip of the spread spectrum signal to generate the plurality of quadrature-phase samples.

As a further alternative, the spread spectrum receiver of FIG. 6B may have the in-phase sampler 122 repetitively sample the in-phase signal at twice, or more than twice, the chip rate of the spread spectrum signal and generate, from at least a first and second samples per chip of the in-phase signal, a first plurality of in-phase samples and a second plurality of in-phase samples, respectively. Also, the quadrature-phase sampler 125 may repetitively sample the quadrature-phase signal at twice, or more than twice, the chip rate of the spread spectrum signal and generate, from the first and second samples per chip of the quadrature-phase signal, a first plurality of quadrature-phase samples and a second plurality of quadrature-phase samples, respectively. This embodiment may include at least a first correlator, a second correlator, a third correlator, and a fourth correlator. The first correlator correlates the first plurality of in-phase samples and the first plurality of quadrature-phase samples with a first correlator chip code, thereby generating a first correlation signal. The second correlator correlates the second plurality of in-phase samples and the second plurality of quadrature-phase samples with the first correlator chip code, thereby generating a second correlation signal. The third correlator correlates the first plurality of in-phase samples and the first plurality of quadrature-phase samples with a second correlator chip code, thereby generating a third correlation signal. The fourth correlator correlates the second plurality of in-phase samples and the second plurality of in-phase samples and the second plurality of quadrature-phase samples with the second correlator chip code, thereby generating a fourth correlation signal.

The code acquisition and tracking circuit 129 of FIG. 6, with these modifications, would acquire and track on the sum of the first, second, third and fourth correlation signal, and generate a reference signal. The detection circuit 130, in response to the reference signal, would detect the first, second, third, and fourth correlation signals, and in response to the first and second correlation signals output a first data symbol, which may be a first data bit, and in response to the third and fourth correlation signals output a second data symbol, which may be a second data bit.

The present invention may be a modified and embodied for handling more than two or four data symbols as taught herein. For example, the circuits can readily be modified with additional correlator circuits to handle eight chip codes, which would handle eight data symbols. Clearly, the samplers may sample at two or more times the chip rate of the spread spectrum code, and these may be combined per the teachings of the present invention.

Figure 6D:
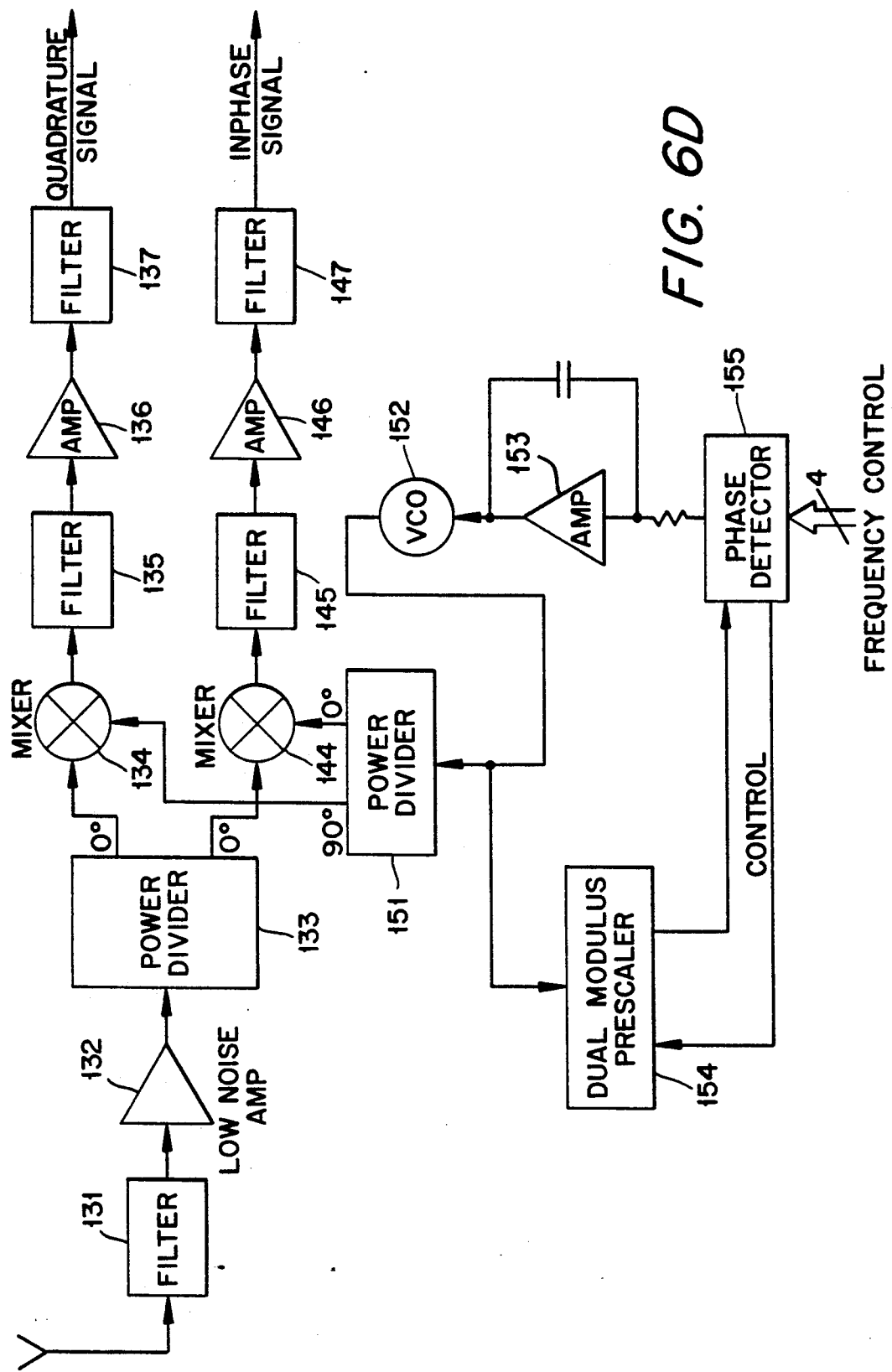
FIG. 6D is a block diagram of the radio frequency (RF) front end of a receiver.

One embodiment of a typical design of the RF section 121 according to the present invention is shown in FIG. 6D. The receiver 121 converts a received signal to baseband in-phase and quadrature-phase components. Shown are a filter 131, a low noise amplifier 132, power divider 133, quadrature-phase mixer 134, first quadrature-phase filter 135, quadrature-phase amplifier 136, and second quadrature-phase filter 137. Also shown are in-phase mixer 144, first in-phase filter 145, in-phase amplifier 146, and second in-phase filter 147. A local oscillator providing a signal to the quadrature-phase mixture 134 and in-phase mixer 144 includes phased detector 155, amplifier 153, voltage control oscillator 152, dual modulus prescaler 154 and power divider 151.

Digital Chip Code Matched Filter

The invention includes the use of two digital circuits which form basic modules that can be configured in many ways to implement receivers for the two types of spread spectrum modulations corresponding to various data rates, processing gains, and in-phase and quadrature-phase signal sample quantization levels.

In this invention the in-phase and quadrature-phase components of the received baseband signal are sampled and quantized. The $k^{th}$ in-phase quantized sample is denoted $i_k$ while the $k^{th}$ quadrature-phase quantized sample is denoted $q_k$. The sampling rate is set at twice the chip rate so that there are two sample times for each chip time duration.

Suppose the chip code consists of L bits denoted by the binary vector $$\underline{c} = (c_1, c_2, c_3, \ldots, c_L)$$

where $c_k$ is the $k^{th}$ chip or binary symbol in the chip code of length L. This chip code is correlated with the in-phase quantized samples with the correlation value at sample time "n" given by $$I_n = c_1(i_{n+1}) + c_2(i_{n+2} + i_{n+3}) + c_3(i_{n+4} + i_{n+5}) + \cdots + c_L(i_{n+2L-2} + i_{n+2L-1}) + D$$

and the corresponding quadrature-phase correlation value given by $$Q_n = c_1(q_n + q_{n+1}) + c_2(q_{n+2} + q_{n+3}) + c_3(q_{n+4} + q_{n+5}) + \cdots + c_L(q_{n+2L-2} + q_{n+2L-1}) + D$$

where the term "D" is a bias term.

Note that since there are two sample times for each chip duration, two sample values are associated with each chip in these correlations. Assume that there is no acquisition of the chip time of the transmitted signal so that the receiver does not know when a chip begins or ends in the transmitted signal and the sample times are independent of the transmitted signal. By sampling at twice the chip rate the in-phase and quadrature-phase correlation process will not need to have the chip time of the transmitted signal. Even with some differences in the transmitter and receiver clocks by sampling twice per chip time duration at least one sample per chip will capture the chip value in noise and provide the desired correlation.

Figure 7:
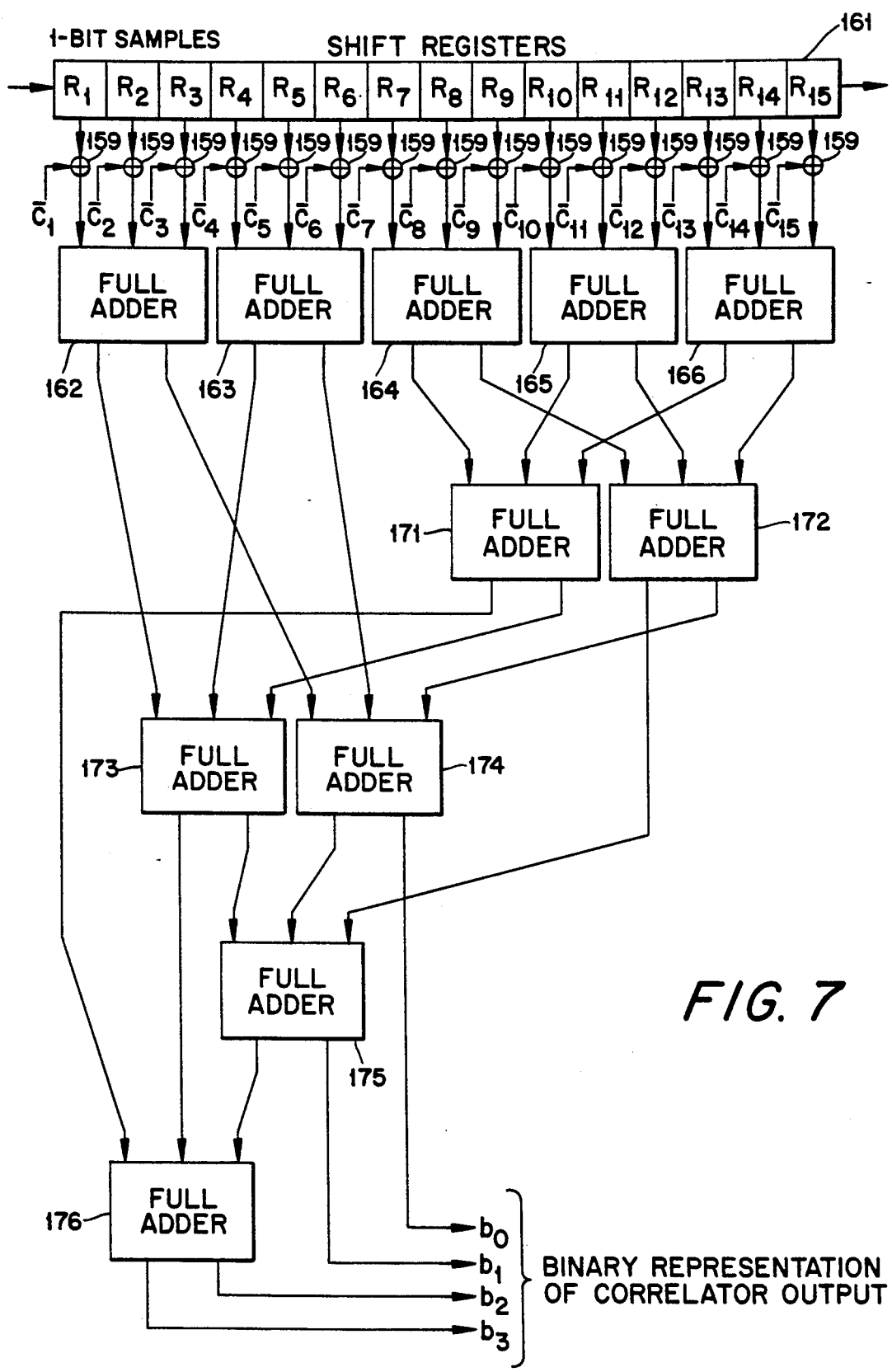
FIG. 7 illustrates one embodiment of a correlator according to the present invention.

The present invention includes a 1-bit correlator comprising first storage means, first comparing means, and first adding means. As shown in FIG. 7, the first storing means may be embodied as shift registers 161, the first comparing means may be embodied as a plurality of comparators 159, and the first adding means may be embodied as a plurality of full adders 162-176. The shift registers 161 store a first plurality of 1-bit samples. The comparators 159 compare the first plurality of 1-bit samples with a first plurality of code chips $C_1, C_2, \ldots C_{15}$, to generate a first plurality of output signals. The plurality of full adders 162-176 adds the first plurality of output signal to generate a first correlation signal, $b_0, b_1, b_2, b_3$.

The 1-bit correlator may further include second storing means, second comparing means, second adding means, and third adding means. The second storing means may be embodied as a second plurality of shift registers, the second comparing means may be embodied as a second plurality of comparators, the second adding means may be embodied as a second plurality of full adders, and the third adding means may be embodied as an adder. The second plurality of shift register stores a second plurality of 1-bit samples. The second comparator compares the second plurality of 1-bit samples with a second plurality of code chips to generate a second plurality of output signals. The second adder generates a second correlation signal from the second plurality of output signals. The third adder adds the first correlation signal with the second correlation signal to generate a third correlation signal.

If the in-phase and quadrature-phase samples of the spread spectrum receiver of FIG. 6A are quantized to one bit each then the correlation function is easily implemented as shown in FIG. 7 for a simple 15 sample correlator. Here the 1-bit samples enter a 15 stage shift register. Each sample is multiplied by a chip bit and then the rest of the correlator counts the number of resulting "1" bits. For such a digital circuit the binary symbols change from "A" and "−A" to "1" and "0" and the main operation of the correlator reduces to counting the number of "1s" in a block of samples that have been modulo-2 added with by "0" or "1" of the chips.

Multiple use of a simple three bit adder circuit called a "full adder" is used to simplify the design of an IC implementation of the correlator. Each full adder takes in three binary input symbols and counts the number of "1" bits and outputs two bits representing in binary form, the count 0, 1, 2, or 3. Basically the first row of full adders provide a row of bits representing the least significant bits out of the adders and another row of bits representing the next significant bits out of the adders. These two rows of bits are then inputs to another row of full adders. At the end a binary representation of the total number of "1" bits is obtained which is the correlation output. Note that this implementation has a pipeline structure which allows for high speed operation especially in an IC implementation where in each sample time a correlation integer is the output of the circuit or IC.

Figure 8:
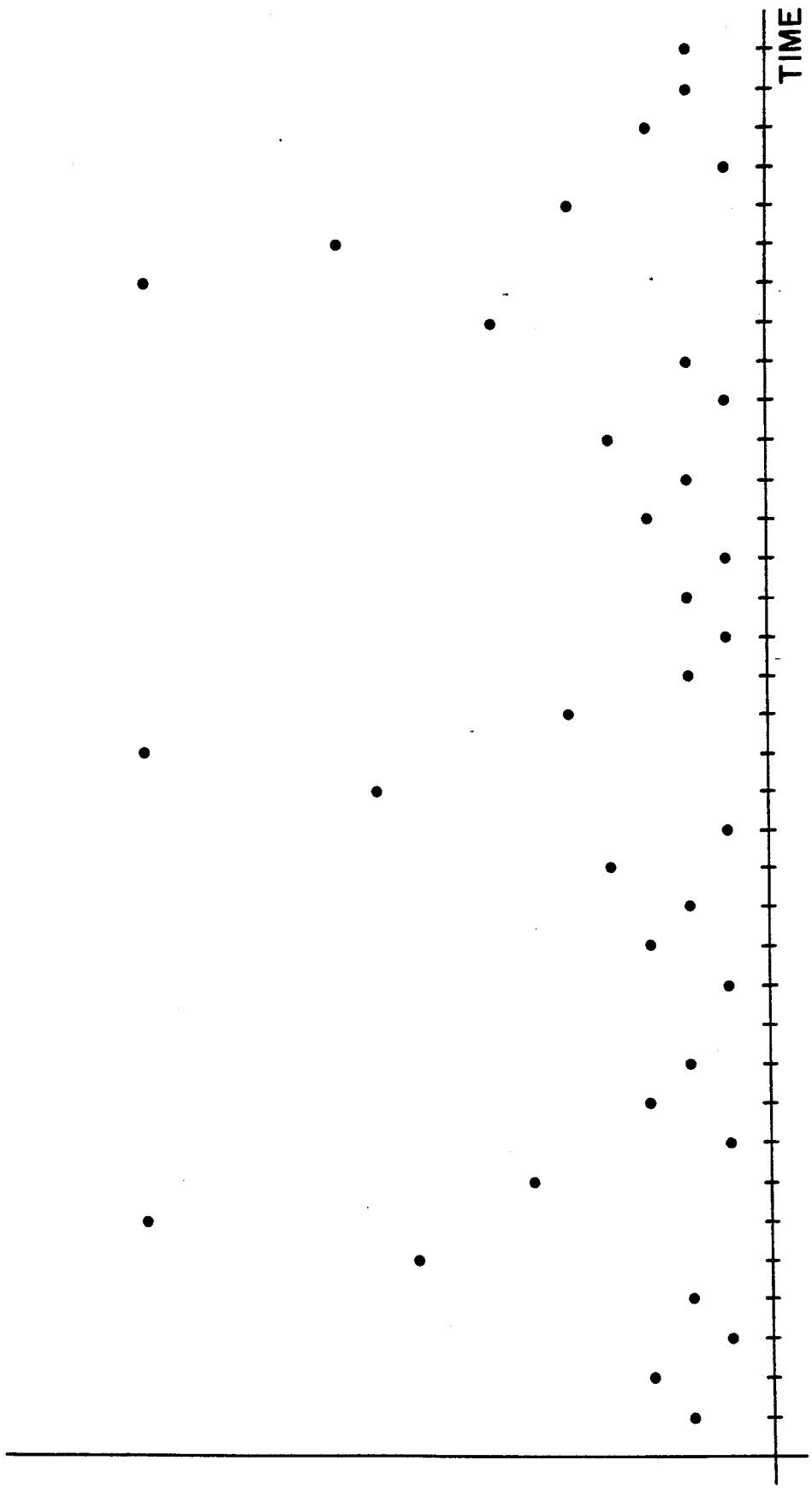
FIG. 8 shows an example of an output of a matched filter where a peak output time corresponds to a code matching sample time.

The basic correlator described in FIG. 7 is one of several possible ways of implementing a digital correlator for 1-bit quantized samples. The basic correlator is a matched filter that is matched to the transmitted chip code. The output of the matched filter is illustrated in FIG. 8 where the peak output times correspond to the sample times when the filter is matched or lined up in time with the actual transmitted chip code.

This correlator for 1-bit samples for a chip code of L chips forms a basic module that can be used in a number of ways to form more complex correlators. The basic 1-bit sample correlator for L chip codes described here can, for example, be used as a module for constructing more complex correlators with more quantization levels for the samples and for longer chip codes.

Denote a 1-bit sample input correlator for a chip code c of L chips as a basic module denoted COR($\underline{c}$,L). This module will have a shift register that shifts the 1-bit samples to the right (see FIG. 7) and can output the right most register bit to be the input to the next module. In this manner a cascade of such modules forms a continuous sequence of registers to hold 1-bit samples. Another output of this module is the correlation value of the specific register samples of the module.

Figures 9, 10:
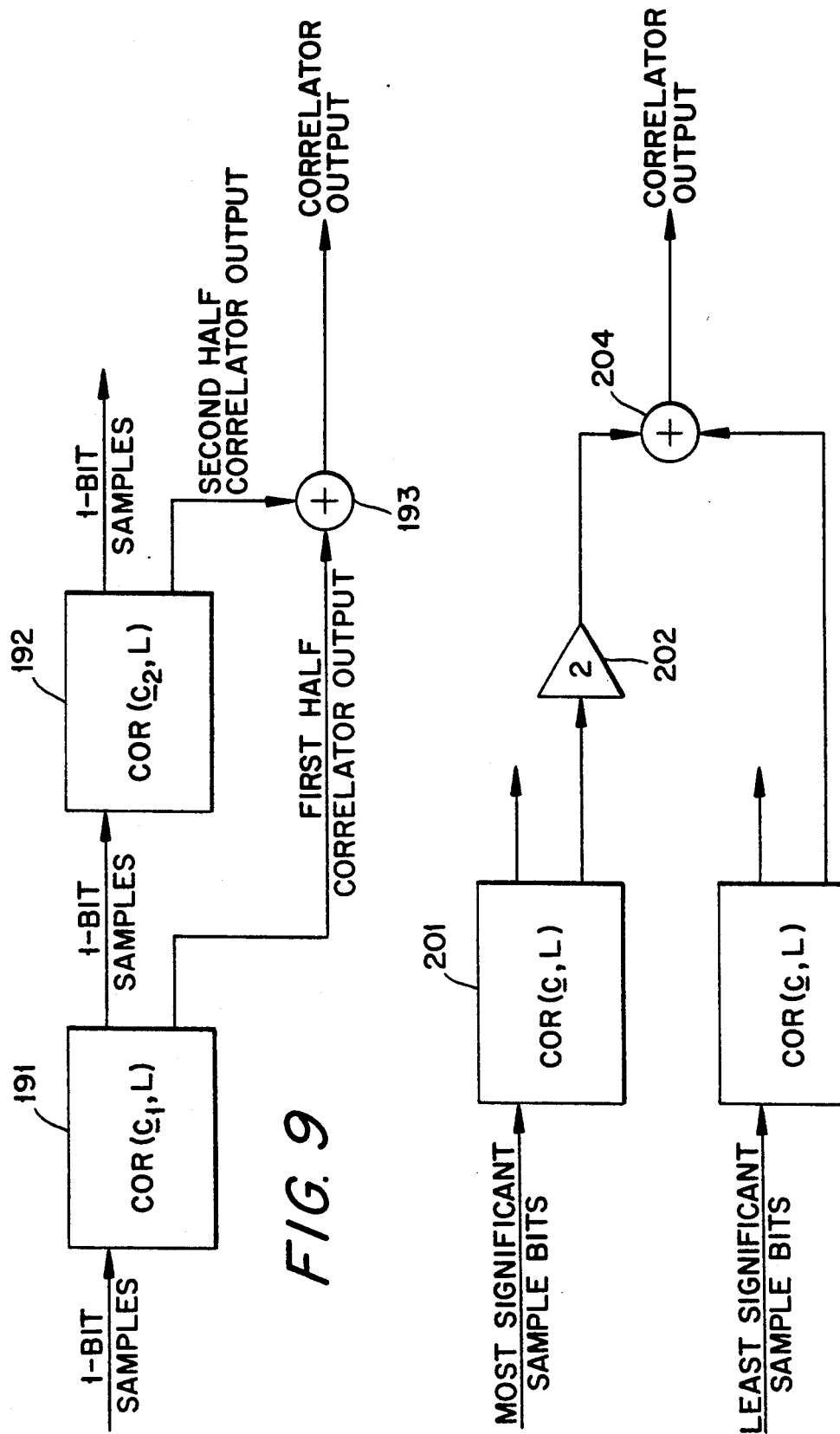
FIG. 9 illustrates implementing two correlators to form a single longer correlator according to the present invention.
FIG. 10 illustrates using two 1-bit sample correlators of the present invention to form a single 2-bit sample correlator by combining most significant sample bits and least significant sample bits.

For a chip code of 2L chips, two of the above L chip correlators can be connected in cascade and their output integers can be added to get the overall 2L chip correlator. This is illustrated in FIG. 9 where $c_1$ is the first L chips and $c_2$ is the second L chips of this chip code of 2L chips. Thus two correlator modules for L bit chips forms a single correlator for a chip code of 2L chips.

Again starting with the basic L chip correlator for 1-bit quantized samples, suppose that the same L chip correlator is desired for 2-bit samples. As shown in FIG. 10 the most significant sign bit of the samples can be used and this binary sequence can be directed into one basic correlator and take the less significant bits of the samples into another basic correlator. To illustrate this further consider a 2-bit sample given by $$s = 2s_1 + s_0$$

where $s_0$ and $s_1$ are binary symbols that have values of $+1$ or $-1$. Then the value of the 2-bit sample "s" is given in terms of the two binary symbols "$s_0$" and "$s_1$" as follows:

| $s_1$ | $s_0$ | s |
|---|---|---|
| +1 | +1 | +3 |
| +1 | −1 | +1 |
| −1 | +1 | −1 |
| −1 | −1 | −3 |

The ideal correlator would take the sample "s" and multiply it by a chip "c" to get the product $$cs = 2cs_1 + cs_0$$

which is then summed over many other such products to get the total correlation value. The first basic 1-bit sample correlator takes as inputs the most significant bit $s_1$ while the second 1 bit correlator takes as inputs the next significant bit $s_0$ of the sample. Doing this with the sequence of 2-bit samples and adding 2 times the output of the first correlator to the output of the second correlator gives the results of the 2-bit sample correlator as shown in FIG. 10.

The construction of a correlator for 3-bit samples can be done similarly with three 1-bit correlators. Here the sample have the form $$s = 4s_2 + 2s_1 + s_0$$

where $s_0$, $s_1$, and $s_2$ are binary symbols taking on values of "+1" and "−1" resulting in the 3-bit quantized sample "s" having the range of values −7, −5, −3, −1, +1, +3, +5, and +7. Here the first 1-bit correlator will have as input the most significant bit "$s_2$" of the sample "s", the second 1-bit correlator will have as input the next most or middle significant bit "$s_1$" of the sample "s", and the third 1-bit correlator will have as input the least significant bit "$s_0$" of the sample "s". The chip code in each correlator is the same but the outputs of first correlator is multiplied by 4 and added to the output of 2 times the second correlator and the output of the third correlator.

The basic 1-bit sample correlator for a chip code of L chips described here can thus be used as a module for constructing more complex correlators with more quantization levels for the samples and for longer chip codes. Representing a 1-bit sample input correlator for a chip code $\underline{c}$ of L chips as a basic module denoted COR($\underline{c}$,L), FIG. 11 illustrates how this basic correlation module can be used to construct the 3-bit sample digital correlator for a code of length 2L where the chip code has $$\underline{c}_1 = (c_1, c_2, c_3, \ldots, c_L)$$

as the first L chips and $$\underline{c}_2 = (c_{L+1}, c_{L+2}, c_{L+3}, \ldots, c_{2L})$$

as the second L chips of the chip code.

The carrier phase of the transmitted signal is generally not known at the receiver so for coherent receivers an estimate of the carrier phase is required. This often results in costly circuits and slow acquisition. This invention uses noncoherent reception where there is no carrier phase acquisition used in the receiver. Here the in-phase and quadrature-phase correlator outputs are combined to form the overall correlator output given by $$C_n = \sqrt{I_n^2 + Q_n^2}\ .$$

This results in some loss in performance of typically 2 to 3 dB in signal to noise ratio but there is a significant reduction in receiver complexity.

The noncoherent receiver has another advantage in terms of the transmitted spread spectrum signal's power spectral density. Since the receiver is noncoherent the overall performance of the communication system is not altered by arbitrarily changing the polarity of the chip codes used in either modulation technique. Thus a pseudo random generator can be used by the transmitter to control the polarity of the sequence of transmitted chip codes while the noncoherent receiver remains independent of such polarity changes. The resulting transmitted signal, however, will exhibit a more uniformly distribution of its power spectrum which will further reduce potential interference to narrowband communications.

Modified Chip Code Matched Filter

When severe multipath results from two signals of nearly equal signal strength arriving at the receiving antenna along two paths from the transmitter, it is possible for the two samples in a chip interval to have opposite signs even without any noise or interference. This happens when the delay between the two paths are less than a chip interval and during one part of the chip interval there is addition of the two signals while in the remaining part there is partial cancellation causing an overall sign change caused by filters and AC coupling in the implementation.

To combat this severe multipath condition, this invention can also use separate correlators can be used for the alternate samples. For the in-phase correlation two correlators defined by $$I_{n,1} = c_1 i_n + c_2 i_{n+2} + c_3 i_{n+4} + \ldots + c_L i_{n+2L-2} + D_o$$
and
$$I_{n,2} = c_1 i_{n+1} + c_2 i_{n+3} + c_3 i_{n+5} + \ldots + c_L i_{n+2L-1} + D_o$$

where $D_o$ is a bias term. In a similar manner two correlators are used for the alternate samples of the quadrature-phase signal to give the correlation values $Q_{n,1}$ and $Q_{n,2}$.

The final correlator output is the noncoherent combining of the four correlator outputs to give $$C_n = \sqrt{I_{n,1}^2 + I_{n,2}^2 + Q_{n,1}^2 + Q_{n,2}^2}\ .$$

Although against noise this noncoherent combining results in some further loss in performance this is often justified to get the gain achieved against severe multipath.

If the sampling rate is increased to three samples per chip duration then three separate correlators can be used and their outputs noncoherently combined in the same manner by taking the square root of the sum of the squares of each correlator output. Again the samples qould be alternately switched between the three correlators so that each of the three samples per chip duration will enter a different correlator. This concept can be generalized to more samples per chip duration in the obvious manner.

Implementation of separate correlators for alternate samples is easily done with the basic correlators described in the previous section. Indeed, all of the generalizations to longer chip codes and to samples with more bits applies directly to the approach given here.

Chip Code Acquisition and Tracking Circuit

Suppose the transmitter sends a periodic sequence of an L bit chip code as shown in FIG. 12. With noise, a typical correlator output would appear as illustrated in FIG. 13. The goal of the basic chip code acquisition and tracking circuit is to acquire and track the periodic peak sample times at the output of the correlator.

In this invention an all digital second order phase locked loop (PLL) is implemented that acquires and tracks the periodic output sample peak points at the output of the correlator. This PLL uses for the correction or error term the difference of some function of the correlator output samples of the first half less the function of correlator output samples of the second half of the 2L samples corresponding to the current estimated time of one chip code interval. Recall that since the correlator works on samples at twice the chip rate there are 2L samples out of the correlator corresponding to the time duration of a single chip code of L chips. A dead zone also is in the middle of the estimated chip code interval where the middle 2d samples are set to zero in computing this error term. In this manner if the large output peak value is further than d samples from the center of the PLL's estimate of the middle of the chip code interval then an error term would result which would force the estimate of the chip code interval to shift to correct this error. This is illustrated in FIG. 14 where if $E_1$ is a function of samples in the first half and $E_2$ is the a function of samples in the second half of the 2L sample interval less the 2d dead zone samples then the correction term for the PLL is $E_1 - E_2$. If the PLL's estimate is accurate enough so that the correlator peak falls in the 2d sample dead zone of the estimated chip code interval then the error term tends to be small and tracking on the correlator peak is maintained.

The digital PLL has two modes of operation: wide and narrow. The wide mode is used for acquisition and the narrow mode for tracking. In the wide mode the error signal uses all 2L samples in the estimated chip code interval except those samples in the dead zone. In contrast, in the narrow mode a smaller fraction of the 2L samples are used. Thus in the narrow mode the PLL ignores the energy of most of the undesired samples which represent noise, interference, and undesired side lobes of the signal.

Since the wide mode is just a transitional mode devised to expedite acquisition the corrections in this mode are relatively large. This is accomplished by the PLL making many incremental correction steps of fixed size for each chip code interval. Once a signal appears and a consistent error term occurs, the local chip clock is slued relatively fast toward the correct phasing relationship between the recovered periodic correlation peaks and the local sequence clock.

There is a "peak search" circuit which controls the mode of the PLL. This circuit examines the location of each peak output of the correlator in the estimated chip code interval and compares this with another window. When the timing of the received correlation peaks is such that several successive chip code intervals have peaks that fall into this prescribed window this peak search circuit switches the PLL to the narrow mode. The PLL continues to converge on the average timing of the received correlation peaks but at a slower rate where only a couple of correlation steps of fixed size is made for each chip code interval. This narrow mode maintains tracking of the correlator output peak times with small corrections. The peak search circuit switches the PLL back to the wide mode when it detects that the majority of the correlation peaks do not fall inside the window. In normal operation this happens only when the signal disappears or when strong noise and/or interference appears in the receiver band.

Once the peak circuit switches the PLL to the narrow mode a smaller "window" of samples are used for computing the error term and the small step changes in response to error terms are used. Here a parameter "w" satisfying $$d < w < L$$

is used to specify the $2w$ samples used in the error computations. Here only the $2w$ samples centered around the center of the estimate of the chip code interval is used to estimate the error term. The primary advantage of using such a window is to eliminate some noise and interference once acquisition is achieved and the PLL is correctly tracking the transmitted chip code positions. Thus once tracking is correctly done there is some further immunity against noise and interference. This is illustrated in FIG. 15.

Pulse Position Signal Demodulation

For the pulse position modulation technique illustrated in FIGS. 2 and 3, a correlator matched to the chip code $\underline{c}$ is used. The correlator will show a peak output value each time any of the codes $\underline{c}$, $\underline{c}_s$, or $\underline{c}_e$ occur with $\underline{c}_s$ resulting in a slightly smaller peak value since $\underline{c}_s$ and $\underline{c}_e$ are merely shortened and extended versions of $\underline{c}$. The positions of these peaks will differ in the sequence. As shown in FIG. 3, however, the average length of the codes in the transmitted sequence is L, the length of the basic chip code $\underline{c}$. Thus the output of the correlator will have an average peak position which provides a fixed reference point in each 2L outputs of the correlator. Note from FIG. 3 that relative to the periodic reference points the pulses are either "early" or "late" by a fixed amount where an early correlator output peak corresponds to a transmitted Manchester encoded "0" bit and a late correlator output peak corresponds to a transmitted "1" bit.

With the output of the correlator into the PLL, the PLL will track this average peak position in each 2L outputs which will serve as a reference for detection. When the PLL is tracking in the narrow mode all the "early peaks" fall into the early part of the timing window and all the "late peaks" fall into the later part of the timing window illustrated in FIG. 15. The maximum timing jitter between successive correlation peaks in the narrow mode due to the operation of the PLL is small and does not interfere with the operation of the correlation chip or the ability of the receiver to recover the transmitted signal.

Figure 16:
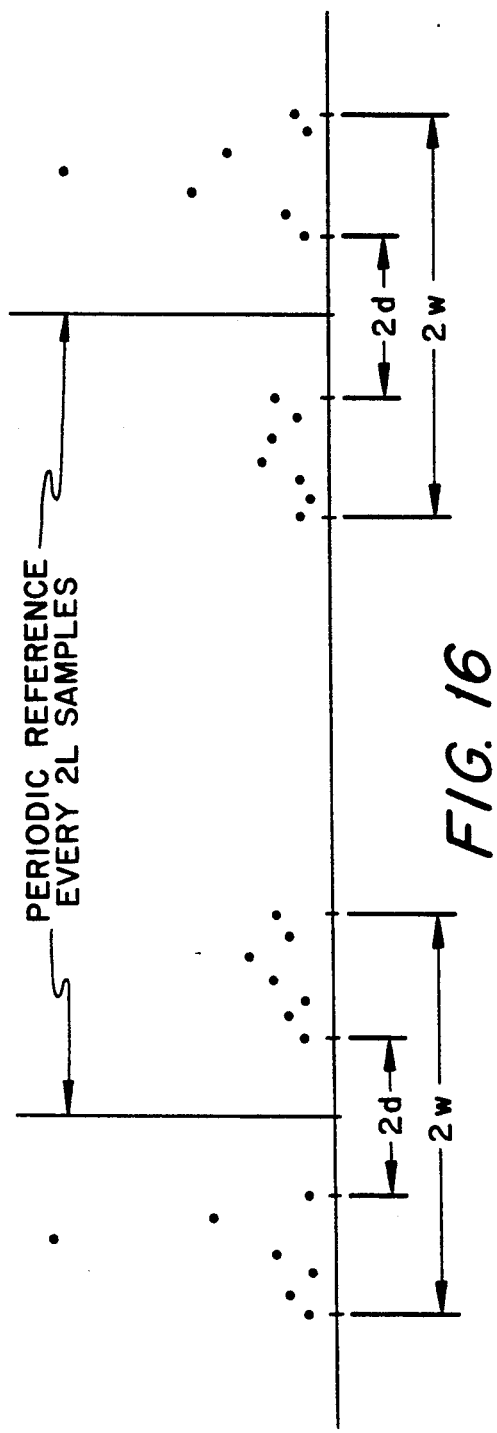
FIG. 16 illustrates the output of the correlator and the periodic reference computed by the phase locked loop.

FIG. 16 illustrates the output of the correlator and the periodic reference computed by the PLL. Here a window of $2w$ samples is used to make a decision as to which side of the periodic reference point lies the correlator output peak. This decision can be based on the advance or delay relative to the reference of the largest peak output in the window or if the information is a single data bit it can be based on the larger of the sum of the $w$ correlator outputs before the reference point compared with the sum of $w$ correlator outputs after the reference point. This latter is roughly the correlator output energy in the $w$ samples of each window.

In the pulse position modulation scheme the early peak outputs correspond to Manchester encoded "0s" while late peak outputs correspond to "1s". The use of Manchester encoding makes it necessary for the receiver to resolve the ambiguity of which pair of correlator output peaks correspond to one encoded data bit. This resolution is based on the fact that each data bit is Manchester encoded into "01" or "10" which means that in the pair of output peaks corresponding to a encoded data bit there must be an early peak followed by a late peak (01) or a late peak followed by an early peak (10). The receiver starts by arbitrarily assuming one possible pairing and then watches for violations of the above rule. If it observes a high percentage of violations of the above rule. If it observes a high percentage of violations it switches to the alternative pairing and it stays that way as long as the percentages of violations is low enough. This is done without actually making a hard decision per each symbol separately but by comparing the timing of consecutive sequences as calculated by the peak search circuit. If the peaks produced by two consecutive peaks are spaced by no more than one sample then a violation is recorded. As noted above, a high percentage of violations will cause the receiver to switch to the other hypothesis. As a consequence of the above the receiver needs a minimum density of transitions (changing from "0" to "1" or visa versa) in order to initially synchronize itself on the Manchester encoder in the transmitter.

Multiple Chip Code Signal Demodulation

In the multiple chip code modulation scheme the binary sequence of symbols that modulate the carrier consists of a continuous cascade of chip codes of length L. As an example there may be only two distinct chip codes $c_1$ and $c_2$ in the sequence as illustrated in FIG. 4 where there is one information data bit sent for each chip code of length L.

Figure 17:
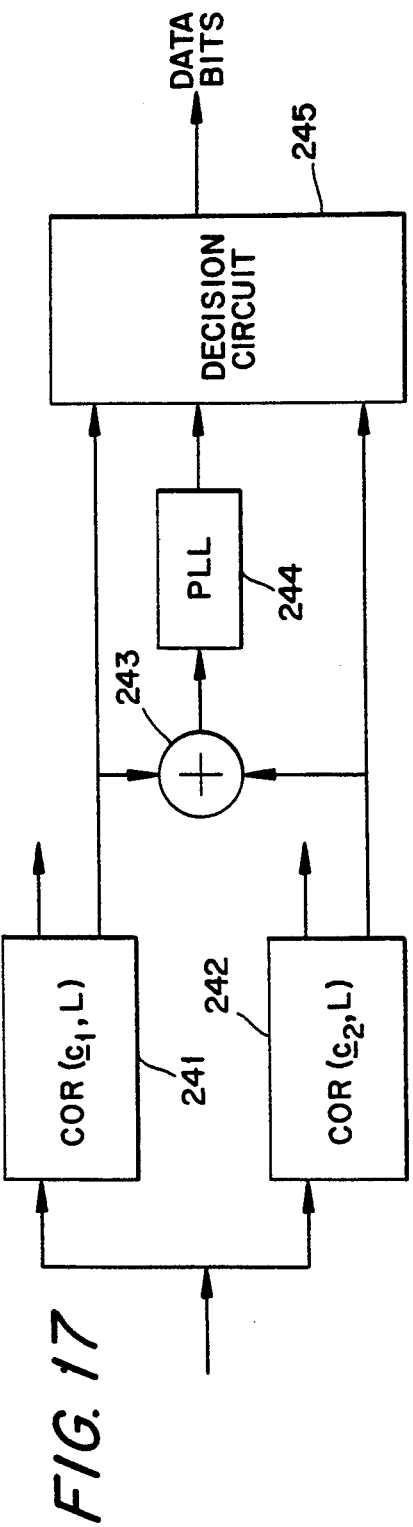
FIG. 17 shows the demodulator for two chip codes using a phase locked loop and "1" bit correlators.

The demodulator for the two chip code case is illustrated in FIG. 17. Here one correlator 241 is matched to chip code $\underline{c}_1$ while the other correlator 242 is matched to chip code $c_2$. The outputs of the two correlators 241, 242 are added together to form a single correlator output where there is now a periodic peak sequence which the PLL 244 can acquire and track. Note that for noncoherent receivers there are in-phase and quadrature-phase samples which enter separate correlators and the square root of the sum of their outputs form the overall correlator output. For noncoherent systems in FIG. 17 we can regard the module denoted COR ($c$, L) as two correlators with two 1-bit samples as input (in-phase and quadrature-phase samples) with the correlator output being the square root of the sum of the two individual correlator outputs.

Note that the PLL 244 in FIG. 17 has as its input a periodic peak input sequence as illustrated in FIG. 13. Once acquisition takes place the PLL will output the location of the periodic peak position.

Once the PLL has acquired the location of the periodic peak pulses in the combined correlator output, the location of these peaks are directed to a decision circuit 245 that examines the individual correlator outputs to determine which correlator output contained the peak point during each chip code interval. Such a decision which is made for every 2L samples is based on the computation of the total energy or the location of the peak output in a window of $2w$ samples centered around the estimated periodic peak reference in the outputs of the correlators matched to $c_1$ and $c_2$.

Figure 18:
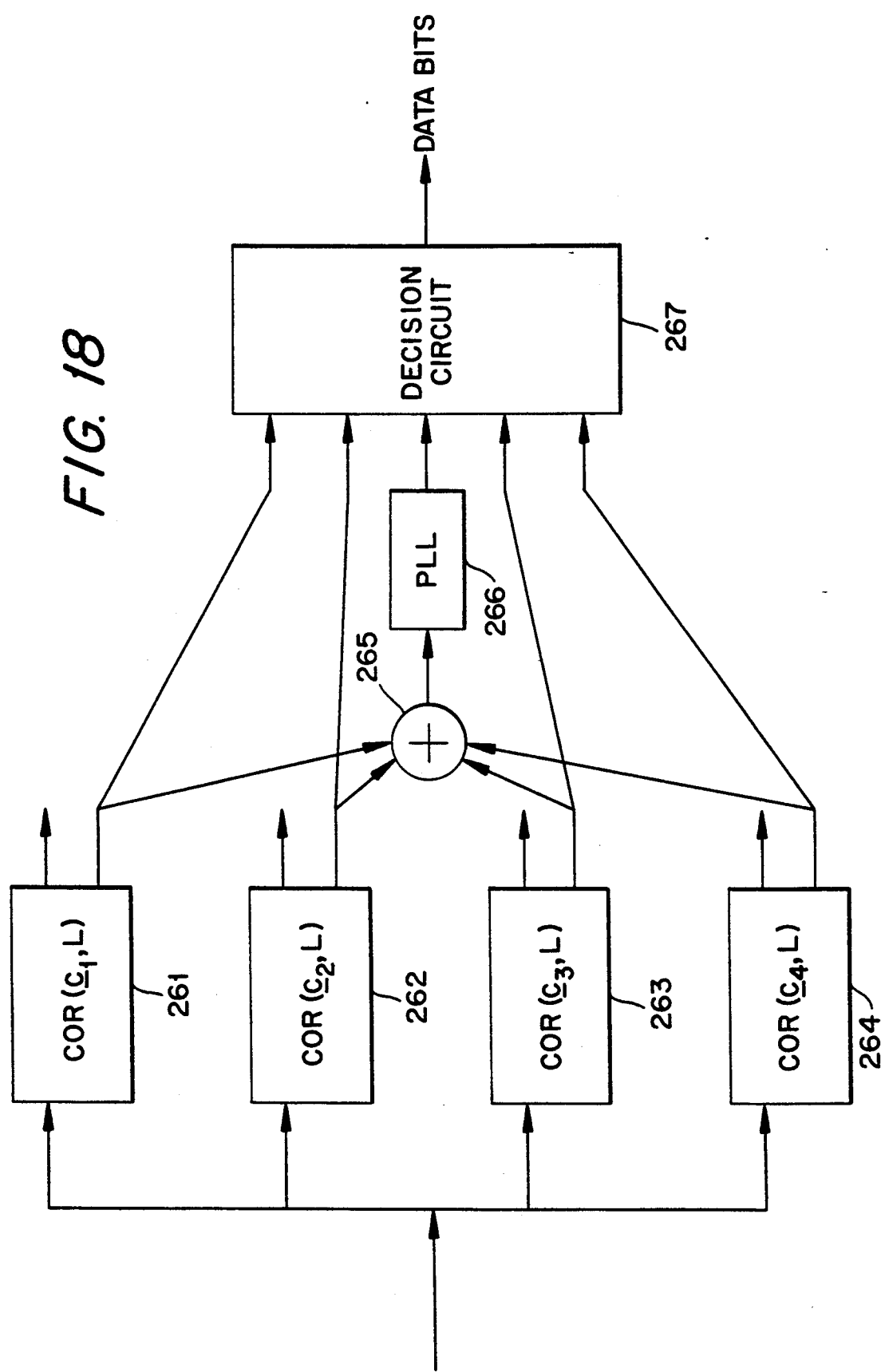
FIG. 18 shows the modulator having four correlators coupled to a phase locked loop and decision circuitry.

For a modulation with four chip codes as illustrated in FIG. 5, the demodulator consists of four correlators 261–264, as shown in FIG. 18, each matched to one of the four chip codes. The outputs of these four correlators are then added together and inputted to the PLL 266 that then acquires and tracks the periodic peak points in each chip code interval which is then used by the detection circuit 267 that determines which of the four correlator outputs had the peak sample during each chip code interval. This is illustrated in FIG. 18.

Detection Metrics

The receiver can make decisions as to which data bits were sent based on one of two metrics where the metrics are based on the correlator(s) outputs in some windows. One metric is the peak sample output value in a window and the other uses the total energy in all the samples in an a window. Thus we can have demodulation detectors making data bit decisions based on comparing peak sample values or total energy measured in different windows.

The receiver in this invention can output the detected data bits based on both types of metrics. Although in most cases the detected data bits will be the same, occasionally an error will occur in one detector while the other detector will make a correct decision. If we use an error detection code such as CRC on the transmitted data then at the receiver blocks of detected data bits can be checked for errors and have a final selection of the data block be the one where there is no error detected. When both data blocks have a detected error in the such as CRC check then an error block is assumed.

The use of the two types of detectors for making decisions together with an error detection code can reduce the overall bit error rate of the spread spectrum communication link. This is partly due to the fact that the performance for these radios is often limited by multipath which can have quite different effects on the two types of metrics and resulting detectors.

Modular IC Circuits

In this invention a digital 1-bit correlator circuit for a chip code of length L is implemented as a single gate array IC. This IC is programmable to allow this correlator to be matched to any selected chip code of length L. In addition the digital phase lock loop circuit for the acquisition and tracking of the peak outputs of a correlator is also implemented as a single gate array IC. These two gate array ICs form the basic modules with which demodulators for many types of spread spectrum signals can be implemented. Specific demodulators for pulse position modulation signals and for multiple chip code modulation signals were developed with these modules.

Demodulators using these modules will consist of simple digital adder circuits, digital decision circuits, and digital glue logic. For low cost volume production the resulting baseband section of the demodulator consisting of all the digital circuits including the modular ICs can be incorporated into a single custom IC. This will result in a receiver with a straightforward RF section and a single IC for the baseband processing.

SNR from Correlator Output

The present invention may further include means for measuring the receiver signal-to-noise ratio based on the average peak value of a correlator output. The correlator may be embodied as correlator 127, FIG. 6C. Experimental observation from using correlator 127 shows that the average peak value of the correlator output is a good estimate of the receiver's signal-to-noise ratio. An increase in noise into correlator 127 decreases the peak value of the correlation signal. Similarly, decreasing the noise into correlator 127 increases the peak value of the correlation signal.

The average peak values of the correlation signal, or the receiver's signal-to-noise estimate, from correlator 127 can be transmitted from the receiver to the transmitter and used by the transmitter for power control.

It will be apparent to those skilled in the art that various modifications can be made to the spread spectrum modulators and demodulators of the instant invention without departing from the spirit or scope of the invention, and it is intended that the present invention cover modifications and variations of the spread spectrum modulator and demodulators provided they come within the scope of the appended claims and their equivalents.

We claim:

1. A 2-bit correlator comprising:
   first correlating means responsive to when a plurality of most-significant 1-bit samples are identical with a first plurality of 1-bit code chips for generating a first correlation signal;
   second correlating means responsive to when a plurality of least-significant 1-bit samples are identical with a second plurality of 1-bit code chips for generating a second correlation signal;
   means coupled to said first correlating means for multiplying the first correlation signal by two; and
   means coupled to said multiplying means and said second correlating means for adding the output from said multiplying means with the second correlation signal.

2. A method using 2-bit correlator comprising the steps of:

generating a first correlation signal when a plurality of most-significant 1-bit samples are identical with a first plurality of 1-bit code chips;

generating a second correlation signal when a plurality of least-significant 1-bit samples are identical with a second plurality of 1-bit code chips;

multiplying the first correlation signal by two; and adding the two times the first correlation signal with the second correlation signal.

3. A method using 3-bit correlator for correlating a plurality of most-significant 1-bit sample bits, a plurality of middle-significant 1-bit sample bits, and a plurality of least-significant 1-bit sample bits with a first plurality of 1-bit code chips, a second plurality of 1-bit code chips and a third plurality of 1-bit code chips, respectively, comprising the steps of:

generating a first correlation signal when the plurality of most-significant 1-bit sample bits are identical with the first plurality of 1-bit code chips;

generating a second correlation signal when the plurality of middle-significant 1-bit sample bits are identical with the second plurality of 1-bit code chips;

generating a third correlation signal when the plurality of least-significant 1-bit sample bits are identical with the third plurality of 1-bit code chips;

multiplying the first correlation signal by four;

multiplying the second correlation signal by two; and adding the output from said first and second multiplying means with the third correlation signal.

4. A method using a 4-bit correlator for correlating at least a plurality of most-significant 1-bit sample bits, a first plurality of middle-significant 1-bit sample bits, a second plurality of middle-significant 1-bit sample bits, and a plurality of least-significant sample bits with a first plurality of 1-bit code chips, a second plurality of 1-bit code chips, a third plurality of 1-bit code chips, and a fourth plurality of 1-bit code chips, respectively, comprising the steps of:

generating a first correlation signal when the plurality of most-significant 1-bit sample bits are identical with the first plurality of 1-bit code chips;

generating a second correlation signal when the first plurality of middle-significant 1-bit sample bits are identical with the second plurality of 1-bit code chips;

generating a third correlation signal when the second plurality of middle-significant 1-bit sample bits are identical with the third plurality of 1-bit code chips;

generating a fourth correlation signal when the plurality of least-significant 1-bit sample bits are identical with the fourth plurality of 1-bit code chips;

multiplying the first correlation signal by eight;

multiplying the second correlation signal by four;

multiplying the third correlation signal by two; and adding the output from said first, second and third multiplying means with the fourth correlation signal.

5. A 3-bit correlator for correlating a plurality of most-significant 1-bit sample bits, a plurality of middle-significant 1-bit sample bits, and a plurality of least-significant 1-bit sample bits with a first plurality of 1-bit code chips, a second plurality of 1-bit code chips and a third plurality of 1-bit code chips, respectively, comprising:

first correlating means responsive to when the plurality of most-significant 1-bit sample bits are identical with the first plurality of 1-bit code chips for generating a first correlation signal;

second correlating means responsive to when the plurality of middle-significant 1-bit sample bits are identical with the second plurality of 1-bit code chips for generating a second correlation signal;

third correlating means responsive to when the plurality of least-significant 1-bit sample bits are identical with the third plurality of 1-bit code chips for generating a third correlation signal;

first means coupled to said first correlating means for multiplying the first correlation signal by four;

second means coupled to said second correlation means for multiplying the second correlation signal by two; and means coupled to said first multiplying means, said second multiplying means and said third correlating means for adding the output from said first and second multiplying means with the third correlation signal.

6. An n-bit correlator for correlating at least a plurality of most-significant 1bit sample bits, a plurality of second-most-significant 1-bit sample bits, a plurality of third-most-significant 1-bit sample bits, and a plurality of least-significant sample bits with a first plurality of 1-bit code chips, a second plurality of 1-bit code chips, a third plurality of 1-bit code chips, and a fourth plurality of 1-bit code chips, respectively, comprising:

first correlating means responsive to when the plurality of most-significant 1-bit sample bits are identical with the first plurality of 1-bit code chips for generating a first correlation signal;

second correlating means responsive to when the plurality of the second-most-significant 1-bit sample bits are identical with the second plurality of 1-bit code chips for generating a second correlation signal;

third correlating means responsive to when the second plurality of the third-most-significant 1-bit sample bits are identical with the third plurality of 1-bit code chips for generating a third correlation signal;

fourth correlating means responsive to when the plurality of least-significant 1-bit sample bits are identical with the foirth plurality of 1-bit code chips for generating a fourth correlation signal;

first means coupled to said first correlating means for multiplying the first correlation signal by eight;

second means coupled to said second correlating means for multiplying the second correlation signal by four;

third means coupled to said third correlating means for multiplying the third correlation signal by two; and means coupled to said first multiplying means, said second multiplying means, said third multiplying means, and said fourth correlating means for adding the output from said first, second and third multiplying means with the fourth correlation signal.

* * * * *